(12) United States Patent
Yanagi et al.

(10) Patent No.: US 7,126,595 B2
(45) Date of Patent: Oct. 24, 2006

(54) IMAGE DISPLAY DEVICE USING A SCANNING AND HOLD DISPLAY MODE FOR POWER SAVING PURPOSES

(75) Inventors: Toshihiro Yanagi, Nara (JP); Kouji Kumada, Tenri (JP); Takashige Ohta, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 255 days.

(21) Appl. No.: 09/924,698

(22) Filed: Aug. 8, 2001

(65) Prior Publication Data

US 2002/0036636 A1 Mar. 28, 2002

(30) Foreign Application Priority Data

Aug. 9, 2000 (JP) .............................. 2000-241796
Jul. 23, 2001 (JP) .............................. 2001-222178

(51) Int. Cl.
*G09G 5/00* (2006.01)
*G09G 3/36* (2006.01)
*G02F 1/1343* (2006.01)

(52) U.S. Cl. .......................... 345/211; 345/92; 345/93; 349/38; 349/39; 349/139

(58) Field of Classification Search ................ 345/211, 345/103, 87–89, 52; 327/536, 537
See application file for complete search history.

(56) References Cited

U.S. PATENT DOCUMENTS

| | | | | |
|---|---|---|---|---|
| 4,915,477 A | * | 4/1990 | Ohta et al. ..................... 345/94 |
| 5,471,225 A | * | 11/1995 | Parks ............................ 345/98 |
| 5,510,916 A | * | 4/1996 | Takahashi .................... 349/110 |
| 5,587,683 A |   | 12/1996 | Kawasaki et al. |
| 5,734,291 A | * | 3/1998 | Tasdighi et al. ............. 327/537 |
| 5,764,225 A |   | 6/1998 | Koshobu |
| 5,777,593 A | * | 7/1998 | Kondoh ........................ 345/97 |
| 5,859,632 A | * | 1/1999 | Ito .............................. 345/211 |
| 5,894,297 A | * | 4/1999 | Mizutome et al. ............ 345/99 |

(Continued)

FOREIGN PATENT DOCUMENTS

EP 1 139 330 10/2001

(Continued)

OTHER PUBLICATIONS

U.S. Appl. No. 09/856,926, filed May 29, 2001, Tsuda, et al.

*Primary Examiner*—Sumati Lefkowitz
*Assistant Examiner*—Alexander S. Beck
(74) *Attorney, Agent, or Firm*—David G. Conlin; David A. Tucker; Edwards Angell Palmer & Dodge LLP

(57) ABSTRACT

Adapting to load currents which differ by more than 100 times between a scanning mode and a hold mode, a frequency of pump operation is decided according to the maximum value of the load currents, and circuit elements of a power supply, for example, such as capacitance of a capacitor for pump operation or a smoothing capacitor, element configurations of switching elements, or capacitance or resistance value of a CR oscillator are set based on this frequency, so that a load current detector lowers the frequency of the pump operation under light load to reduce a self-loss of power in the power supply. This realizes a charge-pump power supply which is installed in a liquid crystal display device of a terminal device of a portable phone, with reduced power consumption under light load and a longer standby time.

49 Claims, 21 Drawing Sheets

U.S. PATENT DOCUMENTS

| | | | |
|---|---|---|---|
| 5,977,940 A * | 11/1999 | Akiyama et al. | 345/94 |
| 5,986,649 A * | 11/1999 | Yamazaki | 345/211 |
| 6,052,103 A * | 4/2000 | Fujiwara et al. | 345/89 |
| 6,064,250 A * | 5/2000 | Proebsting | 327/536 |
| 6,072,453 A * | 6/2000 | Okamoto et al. | 345/97 |
| 6,181,313 B1 | 1/2001 | Yokota et al. | |
| 6,236,394 B1 | 5/2001 | Ikeda | |
| 6,243,066 B1 * | 6/2001 | Murakami et al. | 345/98 |
| 6,259,494 B1 * | 7/2001 | Kawai et al. | 349/39 |
| 6,426,594 B1 * | 7/2002 | Ito | 315/169.1 |
| 6,456,267 B1 * | 9/2002 | Sato et al. | 345/92 |
| 6,522,319 B1 * | 2/2003 | Yamazaki | 345/103 |
| 6,633,287 B1 * | 10/2003 | Yatabe et al. | 345/211 |
| 2001/0020939 A1 | 9/2001 | Ikeda | |

FOREIGN PATENT DOCUMENTS

| | | |
|---|---|---|
| JP | 63-243922 | 10/1988 |
| JP | 03-207097 | 9/1991 |
| JP | 5-064429 | 3/1993 |
| JP | 05-203920 | 8/1993 |
| JP | 07-160215 | 6/1995 |
| JP | 07-181913 | 7/1995 |
| JP | 07-199868 | 8/1995 |
| JP | 7-288972 | 10/1995 |
| JP | 09-127556 | 5/1997 |
| JP | 09-243995 | 9/1997 |
| JP | 10-083157 | 3/1998 |
| JP | 10-312695 | 11/1998 |
| JP | 11-231279 | 8/1999 |
| JP | 11-252900 | 9/1999 |
| JP | 2000-056738 | 2/2000 |
| JP | 2000-089356 | 3/2000 |
| JP | 2000-166220 | 6/2000 |

* cited by examiner

IMAGE DISPLAY DEVICE USING A SCANNING AND HOLD DISPLAY MODE FOR POWER SAVING PURPOSES

FIELD OF THE INVENTION

The present invention relates to an image display device having a charge-pump power supply, and to portable electrical equipment such as a terminal device of a portable phone employing such an image display device.

BACKGROUND OF THE INVENTION

Portable electrical equipment as represented by terminal devices of portable phones has been rapidly advancing over the last years, and expectations are high for these devices. The choice of image display device by these devices is a liquid crystal display device, which is thin and light-weight and low power consuming. Currently, terminal devices of portable phones use a liquid crystal display device of the simple-matrix variety. However, in anticipation of improved performance or much faster data communication speed, these devices are expected to be used in a variety of ways, such as portable TV telecommunications and Internet connection. For these purposes, a liquid crystal display device of the TFT active-matrix variety, which has a high display quality and fast response, is most suitable.

Here, the terminal device of the portable phone is commonly required to constantly display various information such as availability of communication, time, or remaining life of a battery, as shown in FIG. 8, even during standby in which no conversation or data communication is carried out. However, the power consumption of the liquid crystal display device during standby greatly influences the remaining life of a battery, and, in effect, influences the total standby time. It is known in industry that the terminal device of a portable phone, which does not allow the use of a large battery, with the total standby time of less than 200 hours is practically useless or unmarketable.

FIG. 9 shows one example of a relationship between power consumption of a liquid crystal display device and a total standby time of a terminal device of a portable phone. As can be seen from FIG. 9, the power consumption of the liquid crystal display device needs to be about 3 mW to have the total standby time of more than 200 hours. In terminal devices of portable phones currently available, the power consumption of the entire device is about 5 mW, whereas that of the STN liquid crystal display device of the simple-matrix variety is about 1 mW. This meets the foregoing requirement.

This is not the case for the liquid crystal display device of the TFT active-matrix variety, which consumes power in a range of 30 mW to several hundred mW, and the total standby time is only around 50 hours. This practically requires charging the battery every other day. It was therefore impossible to bring the liquid crystal display device of the TFT active-matrix variety for use as the liquid crystal display device which requires a constant display of various information even during standby.

SUMMARY OF THE INVENTION

It is an object of the present invention to provide an image display device and portable electrical equipment having a charge-pump power supply which can further reduce power consumption under light load.

An image display device according to the present invention is an active-matrix image display device which includes a power supply of a charge-pump system, and drivers which come into operation in response to supply of power from the power supply to drive display cells, and in order to achieve the foregoing object, the drivers have two operation modes including a scanning mode in which a video signal is applied to any of the display cells, and a hold mode in which no video signal is applied to the display cells, and the active-matrix image display device comprises: a mode switching section for periodically changing the operation modes so that duration of the hold mode is equal to or longer than duration of the scanning mode; and a control section for switching, according to the operation modes, a frequency at which pump operation of the power supply is activated.

According to this arrangement, the mode switching section periodically switches operation modes of the drivers. In the scanning mode, the drivers apply a video signal to any of the display cells and thus consumes relatively large power. On the other hand, in the hold mode, the drivers apply no video signal to the display cells and thus power consumption is lower than that in the scanning mode.

Further, for example, where low power consumption is required, such as during standby of a portable phone, the mode switching section switches the operation modes, while substantially maintaining display of the display cells, so that the duration of the hold mode becomes longer than that of the scanning mode. As a result, power consumption of the drivers and the display cells can be greatly reduced.

The control section switches frequencies of the pump operation of the power supply according to operation modes, for example, by measuring consumed current or detecting a signal for switching the operation modes. As a result, the power supply can effect the pump operation at a frequency according to operation modes, thus generating output voltages without fail at high conversion efficiency in either operation mode.

This makes it possible to provide an active-matrix image display device with a basic display quality such as brightness, contrast, response speed, and tones, while maintaining power consumption at low level.

Further, an image display device according to the present invention is an active-matrix image display device which includes a power supply of a charge-pump system, and drivers which come into operation in response to supply of power from the power supply to drive display cells, and, in order to achieve the foregoing object, the image display device has the following arrangement.

That is, the drivers have two operation modes including a scanning mode in which a video signal is applied to any of the display cells, and a hold mode in which no video signal is applied to the display cells, the power supply maintaining an output voltage value by a smoothing capacitor which is maintained at an output of the power supply while the pump operation is inactive, and the power supply includes: a control section for stopping the pump operation of the power supply according to the hold mode; and a mode switching section for periodically changing the operation modes so that duration of the hold mode is equal to or longer than duration of the scanning mode.

According to this arrangement, as in the foregoing image display device, the operation modes are switched, while substantially maintaining display of the display cells, so that the duration of the hold mode becomes longer than that of the scanning mode. As a result, power consumption of the drivers and the display cells can be greatly reduced. Further, since the pump operation of the power supply is inactivated for a period according to the hold mode, the power consumption of the power supply during a hold mode can also be reduced. Note that, since no video signal is applied to any display cell in the hold mode, the image display device can maintain a displayed image without any trouble even when the pump operation of the power supply is inactivated until the next scanning mode.

This makes it possible to provide an active-matrix image display device with a basic display quality such as brightness, contrast, response speed, and tones, while maintaining power consumption at low level. Further, irrespective of whether the pump operation is inactivated or not, it is preferable that a period of the hold mode is set to be several times to several ten times longer than a period of the scanning mode.

According to this arrangement, since the period of hold mode in which power consumption is low is much longer (several times to several ten times) than the period of scanning mode in which power consumption is high, it is highly effective to reduce power consumption under light load in the foregoing manner.

Further, in order to achieve the foregoing object, portable electrical equipment of the present invention includes any one of the foregoing image display devices.

According to this arrangement, in view of the fact that portable electrical equipment is usually driven by an installed battery, to reduce power consumption in the described manner is effective. It is particularly effective when the portable electrical equipment is a terminal device of a portable phone since in this case a standby time can be extended.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention with reference to FIG. 1 through FIG. 5 and FIG. 10 through FIG. 14.

Figure 1:
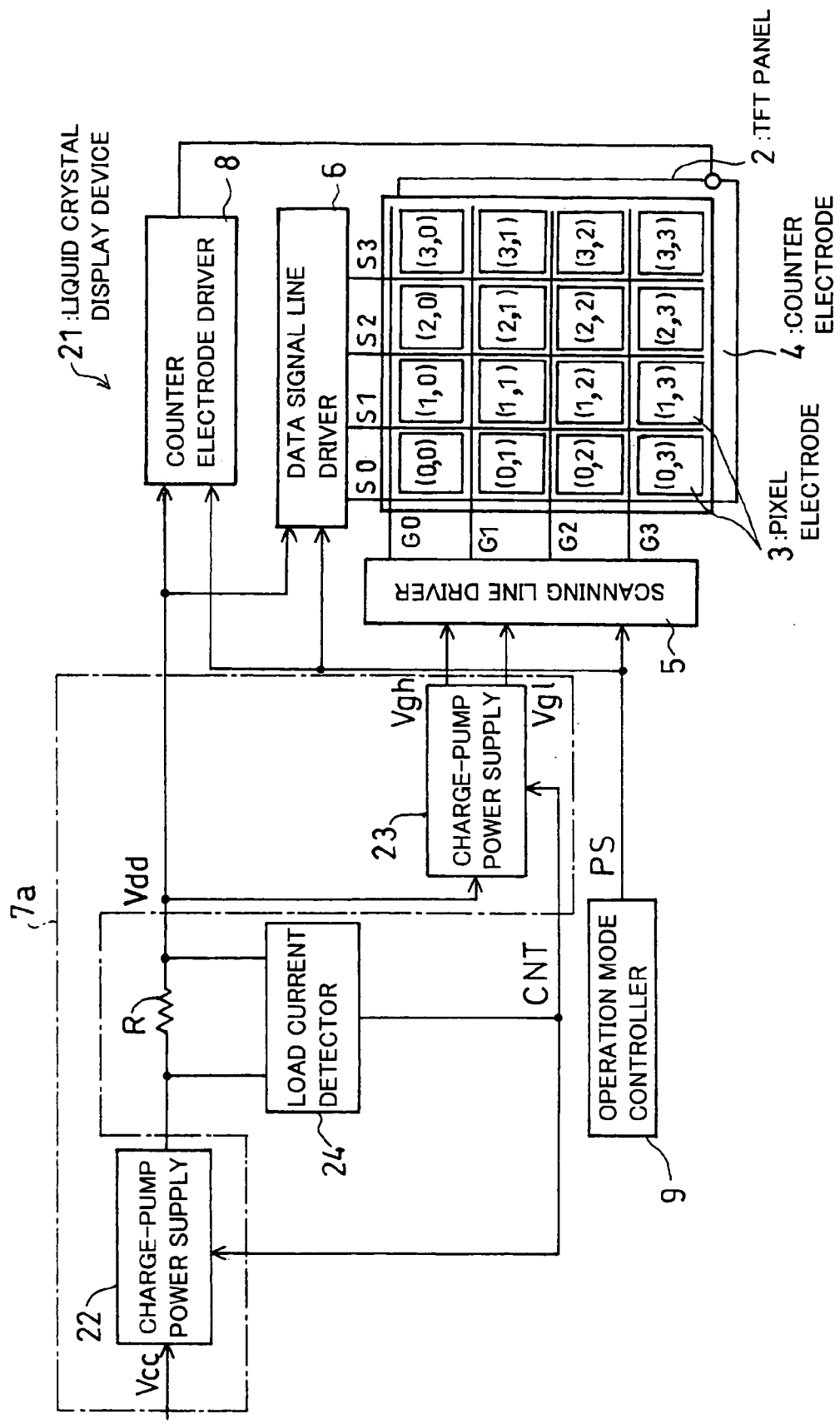
FIG. 1 is a block diagram showing an electrical structure of a liquid crystal display device of one embodiment of the present invention.

FIG. 1 is a black diagram showing an electrical structure of a liquid crystal display device 21 of one embodiment of the present invention. The liquid crystal display device 21, which is an image display device, is installed in a terminal device of a portable phone. The liquid crystal display device 21 includes a TFT panel 2, a scanning signal line driver 5, a data signal line driver 6, a counter electrode driver 8, and an operation mode controller 9, and, as will be described later, a hold mode is inserted in a scanning mode of each vertical scanning period T1 during standby in response to a power save signal PS from the operation mode controller 9.

The TFT panel 2 includes a pixel electrode 3 which is provided in each area created by scanning signal lines G1, G2, . . . , Gi (collectively referred to as "G" hereinafter where appropriate) of i rows and data signal lines S1, S2, . . . , Sj (collectively referred to as "S" hereinafter where appropriate) of j columns, wherein an image is displayed by a change in transmittance of liquid crystal between the pixel electrode 3 and a counter electrode 4, which change is induced by a voltage held across the pixel electrode 3 and the counter electrode 4. Note that, in FIG. 1, i=j=4 for simplicity.

The scanning signal lines G are successively selected per horizontal scanning period by the scanning signal line driver 5, and the data signal lines S output a voltage which corresponds to individual image data per horizontal scanning period by the data signal line driver 6, so that a voltage is outputted to the corresponding pixel electrode 3 per predetermined scanning period via a TFT element 114 (mentioned later) which is formed at each intersection of the signal lines G and S. The scanning signal line driver 5 receives, from a power supply 7a, a scanning voltage Vgh and a non-scanning voltage Vgl for switching ON and OFF the TFT element, respectively. The data signal line driver 6 receives a power voltage Vdd from the power supply 7a. The power supply 7a also feeds the power voltage Vdd to the counter electrode driver 8 which drives the counter electrode 4.

Figure 4:
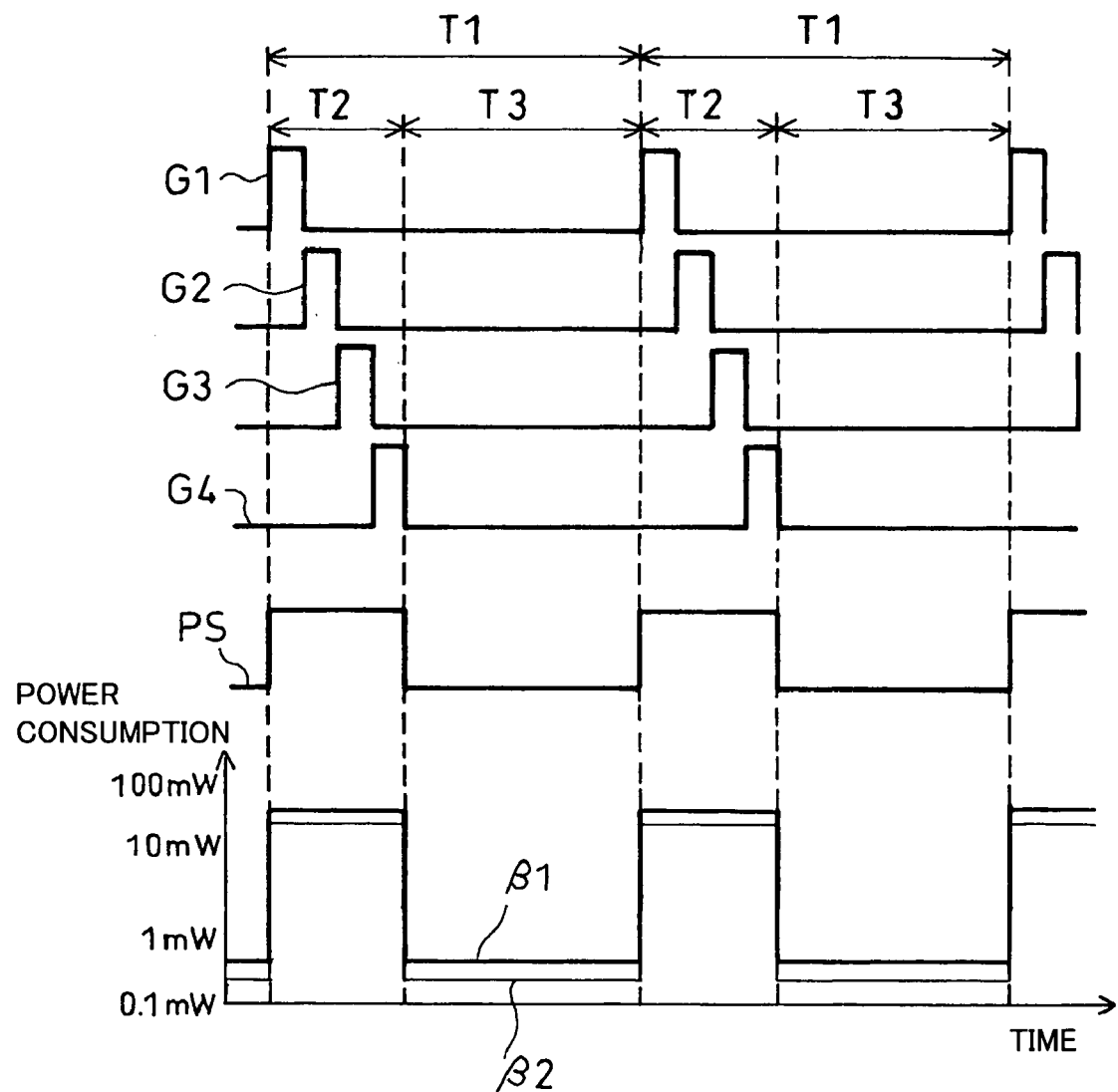
FIG. 4 is a waveform diagram explaining operation of the liquid crystal display device of FIG. 1.

What is significant about the liquid crystal display device 21 is the provision of the operation mode controller 9 which outputs the power save signal PS during standby so as to extend one vertical scanning period. That is, during standby, as shown in FIG. 4, one vertical scanning period T1 is divided into a scanning period T2 (scanning mode) during which any of the scanning signal lines G is scanned as in normal driving, and a non-scanning period T3 (hold mode) during which no scanning signal line G is scanned. The scanning mode and the hold mode are repeated alternately to reduce power consumption. By the provision of the hold mode, the vertical scanning frequency becomes, for example, 6 Hz, i.e., the vertical scanning period T1 is 167 msec.

In FIG. 4, G1 through G4 indicate respective waveforms of the scanning signal lines G1 through G4, and PS indicates a waveform of the power save signal PS. In the scanning mode, as in normal driving, the scanning signal line driver 5 outputs a scanning voltage (ON voltage of TFT) to any of the scanning signal lines G1 through G4, and outputs a non-scanning voltage (OFF voltage of TFT) to the other scanning signal lines. In accordance with these outputs, the data signal line driver 6 outputs a voltage which corresponds to individual display image data to the data signal lines S1 through S4, and the counter electrode driver 8 drives the counter electrode 4 with an waveform of an arbitrary shape (e.g., rectangular wave in the case of line inversion driving).

On the other hand, in the hold mode, the data signal line driver 6 outputs no signals to the data signal lines S1 through S4, and comes to rest to save power consumed by the data signal line driver 6 itself. Further, in order to maintain a display voltage of each pixel, the scanning signal line driver 5 outputs the non-scanning voltage (OFF voltage of TFT) to all scanning signal lines G1 through G4, thus maintaining display by the charge stored in the pixel electrode 3 and an auxiliary capacitor of each pixel.

In the foregoing system structure, the power voltage Vdd, which derives from an analog source, is determined by the voltage-luminance characteristics of the liquid crystal material used, and is usually about 5 V. However, a power voltage Vcc used in a logic circuit has a low voltage of around 2.5 V to reduce power consumption. Therefore, the power supply 7a converts the supplied power voltage Vcc=2.5 V by multiplying it by two by a charge-pump method to create Vdd=5 V. Note that, a DC-DC converter of a switching type employing a coil is not preferable in view of such factors as efficiency and its low height and small size.

Here, when the TFT panel 2 has the diagonally measured length of about 2 inches, which is suitable for a terminal device of a portable phone, and has the resolution of 176×RGB×220, for example, the current which flows through the system of the power voltage Vdd becomes around 6 mA in a scanning mode. Meanwhile, in the hold mode, most circuit groups come to rest to save power consumed by themselves, but the power does not completely become 0 and the current of about 40 μA is flown. Here, since Vdd=5 V, the power consumed by the Vdd system in the respective modes becomes $$\text{scanning mode: } W_{vdd\ scan} = 5\ V \times 6\ mA = 30\ mW \quad (1)$$

$$\text{hold mode: } W_{vdd\ hold} = 5\ V \times 40\ \mu A = 0.2\ mW \quad (2)$$

and there is a difference of more than 100 times.

Thus, during standby, when the ratio T2:T3 of the period T2 of a scanning mode and the period T3 of a hold mode is, for example, 1:14, the total power consumption $W_{vdd}$ of the Vdd system during standby becomes 2.19 mW from the equation $$W_{vdd} = \{T2/(T2+T3)\}W_{vdd\ scan} + \{T3/(T2+T3)\}W_{vdd\ hold}.$$

As a result, power consumption can be significantly reduced from the power consumption under normal conditions which is substantially equal to the power consumption in the scanning mode.

However, as mentioned above, the power voltage Vdd is created from the power voltage Vcc by the power supply 7a of the charge-pump system, and therefore power consumption of the liquid crystal display device 21 is increased with decrease in conversion efficiency of the power supply 7a. In such an event, it may become difficult or impossible to install the liquid crystal display device 21 in a terminal device of a portable phone.

Figure 10:
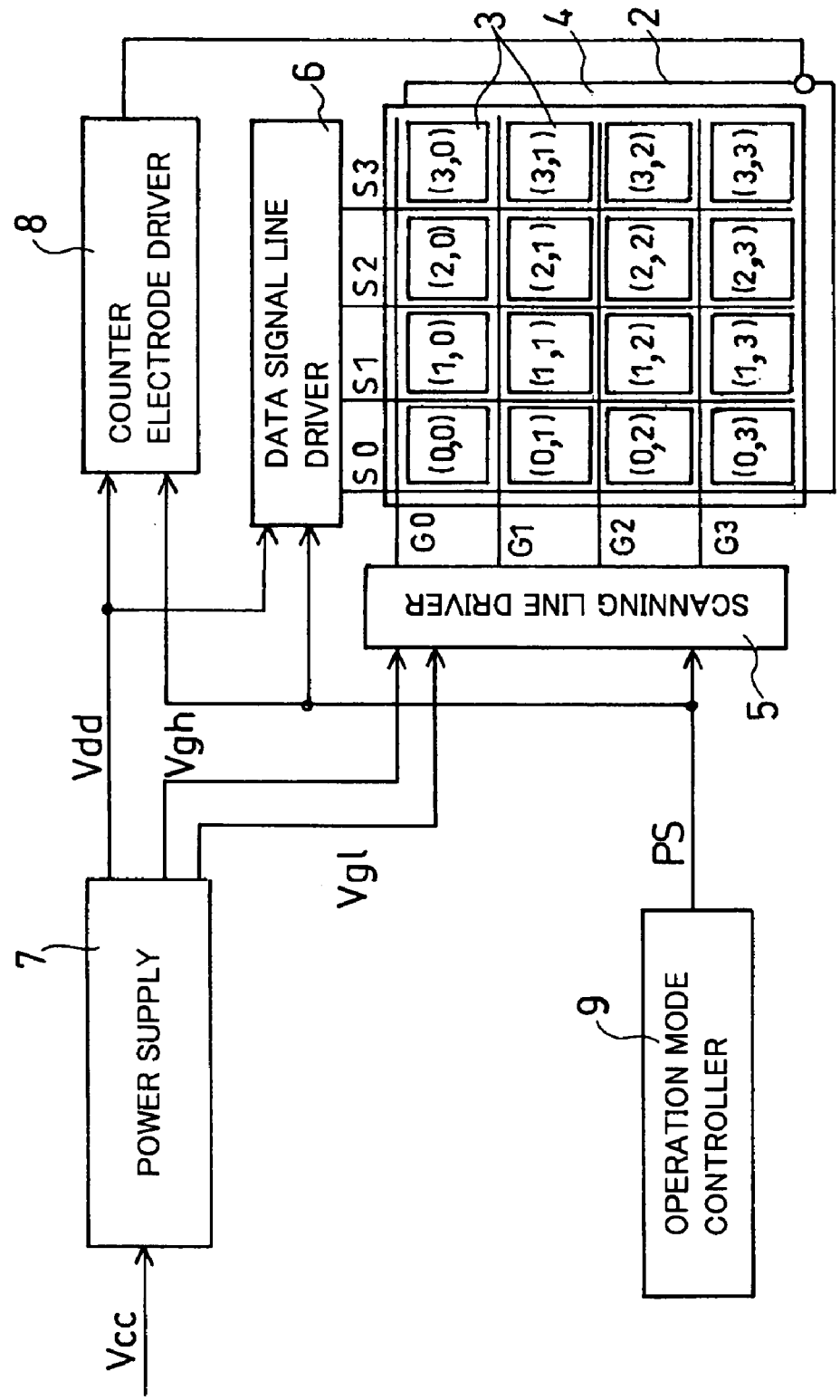
FIG. 10 is a block diagram showing an electrical structure of a liquid crystal display device of a TFT active-matrix type as a comparative example of the present invention.

Here, before describing other significance of the liquid crystal display device 21 of the present invention, a conversion efficiency will be explained based on a liquid crystal display device 1 as a comparative example, as shown in FIG. 10, which is provided with a power supply 7 of the charge-pump system in which the frequency of pump operation is constant.

As with the liquid crystal display device 21 of FIG. 1, the liquid crystal display device 1 includes a TFT panel 2, drivers 5, 6, and 8, and an operation mode controller 9, but unlike the liquid crystal display device 21, a frequency fosc of pump operation of the power supply 7 is fixed. Here, when the frequency fosc is low as shown by a frequency foscl in FIG. 2, a voltage drop by a load current becomes more significant than the case of a higher frequency (frequency fosch), and the power supply 7 will not be able to supply an output voltage (2×Vin) when the load current is maximum (e.g., 6 mA). Therefore, the frequency fosc of the power supply 7 is set to a frequency, for example, such as the frequency fosch, so that there is no voltage drop at an expected load current.

Figure 13:
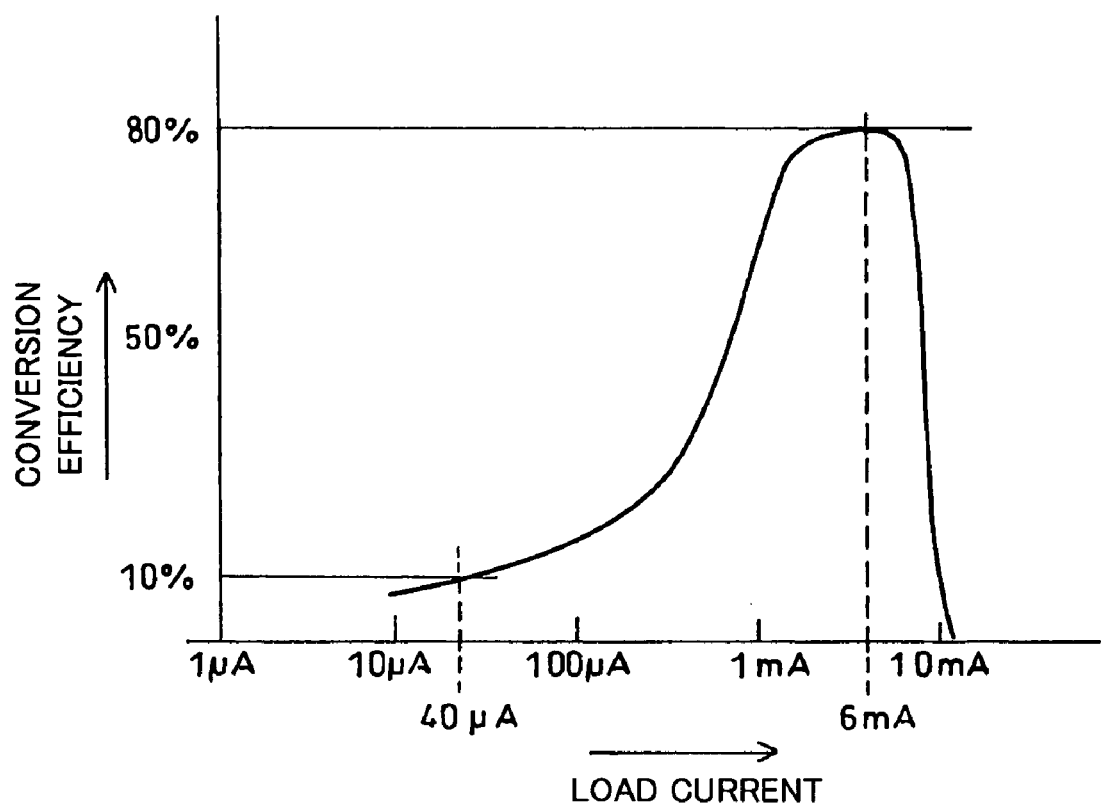
FIG. 13 is a graph showing conversion efficiency characteristics of the charge-pump power supply.

FIG. 13 is a graph showing conversion efficiency characteristics of a power supply of the charge-pump system in which the frequency fosc is set as above. As shown in FIG. 13, the conversion frequency is as high as around 80% in a range of load current from 1 mA to 10 mA where the maxima is at 6 mA, and the conversion efficiency becomes about 10% at an extremely small load current. This is due to a self-loss of power in the power supply of the charge-pump system as exemplified by a clock generator 11 (described later) which is realized by a CR oscillator, etc., and/or due to the leak current of switching elements SW1 through SW4 (described later), which are constant irrespective of the load.

Therefore, from the efficiency characteristics of FIG. 13, the power consumption of the Vcc system in the liquid crystal display device 1 becomes $$\text{scanning mode: } W_{vcc\,scan} = W_{vdd\,scan} / 80\% \quad (3)$$
$$= 37.5 \text{ mW}$$

$$\text{hold mode: } W_{vcc\,hold} = W_{vdd\,hold} / 10\% \quad (4)$$
$$= 2.0 \text{ mW}.$$

Figure 11:
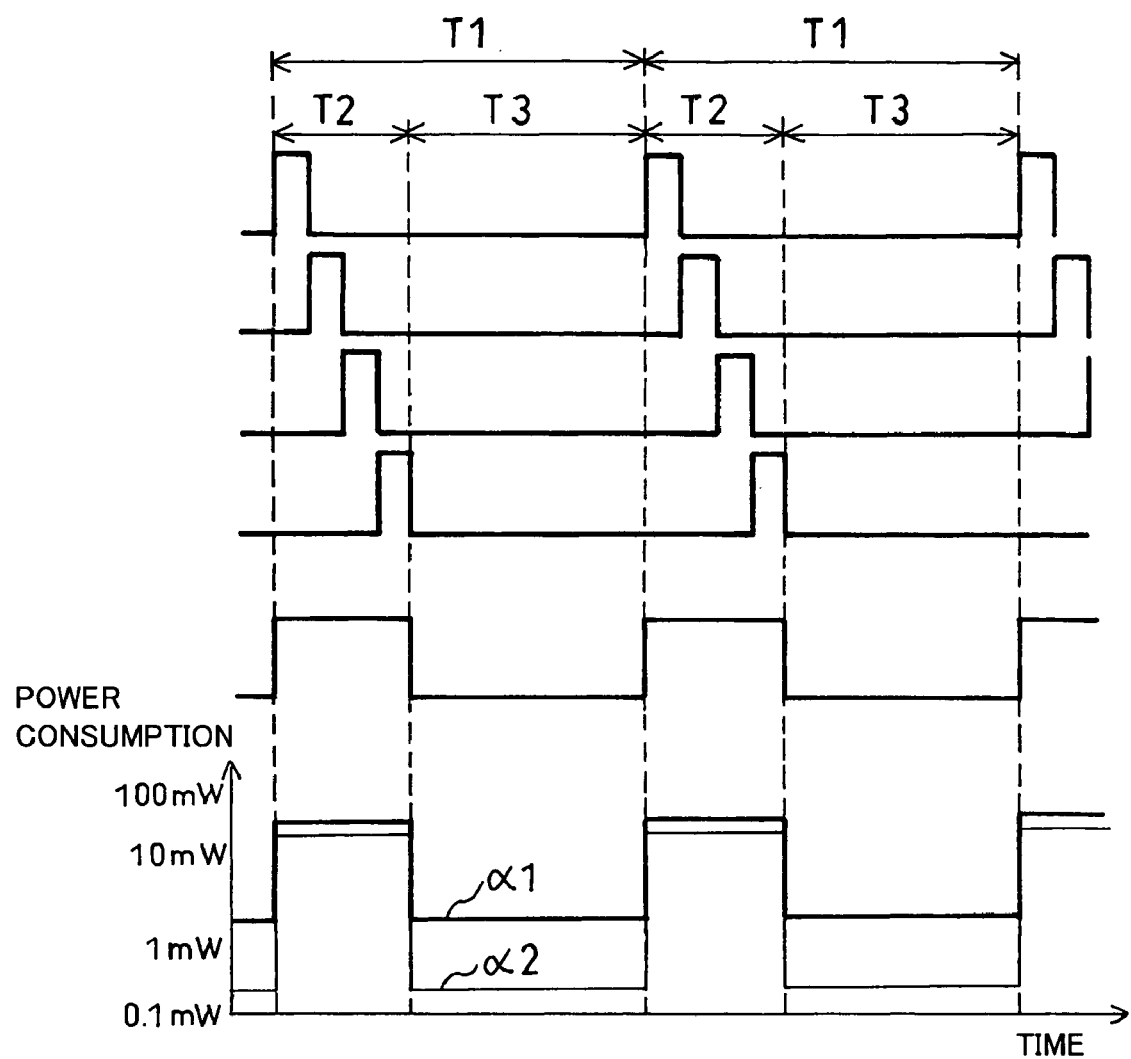
FIG. 11 is a waveform diagram explaining operation of the liquid crystal display device of FIG. 10.

In FIG. 11, a change in power consumption of the Vcc system is indicated by α1, and a change in power consumption of the Vdd system is indicated by α2.

Further, from the ratio of the scanning mode period T2 and the hold node period T3, the total power consumption $W_{V_{cc}}$ of the Vcc system becomes $$W_{Vcc} = \{T2/(T2+T3)\}W_{Vcc\,scan} + \{T3/(T2+T3)\}W_{Vcc\,hold}. \quad (5)$$

Thus, for example, when T2:T3=1:14, the total power consumption can be reduced to $W_{V_{cc}}$=4.4 mW.

Figure 9:
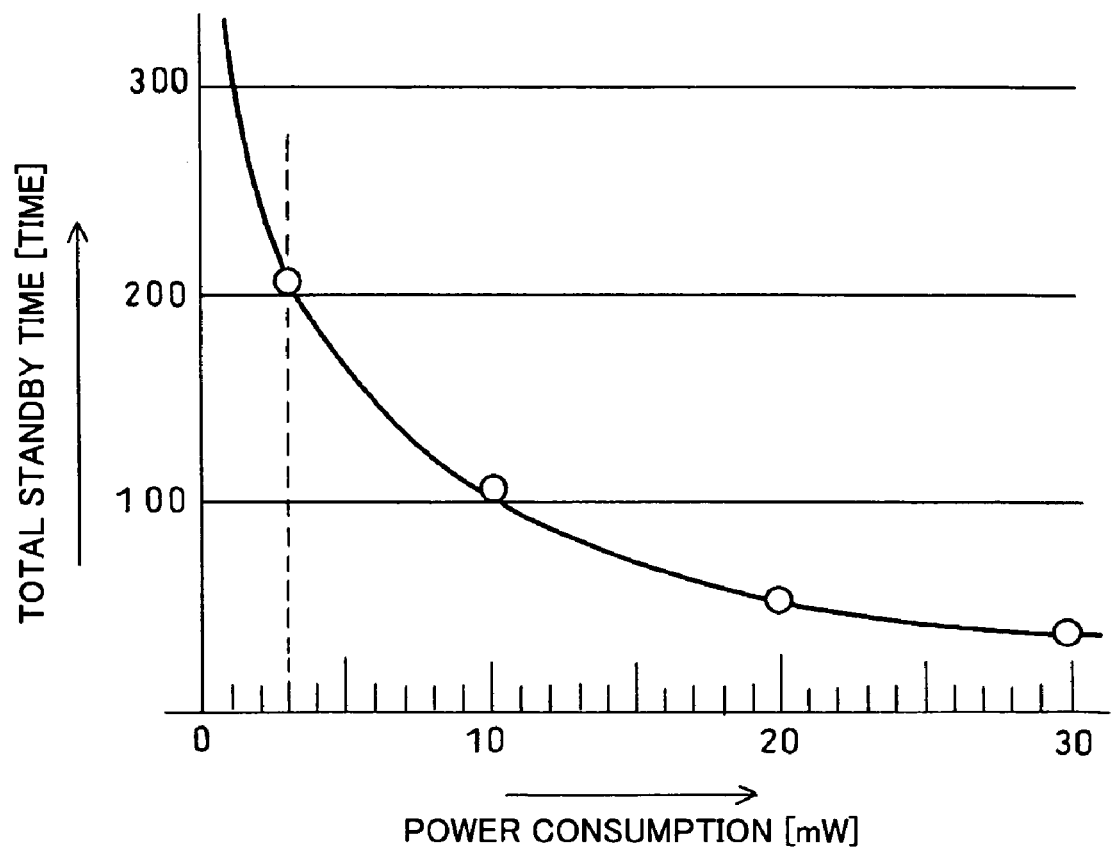
FIG. 9 is a graph showing a relationship between power consumption of the liquid crystal display device and standby time of the terminal device of the portable phone.

However, according to FIG. 9, the total standby time is around 150 hours, and it is still difficult, even with the use of the liquid crystal display device 1 of FIG. 10, to install a liquid crystal display device of the TFT active-matrix type in a terminal device of a portable phone.

On the other hand, as shown in FIG. 1, the significance of the liquid crystal display device 21 of the present embodiment is that it includes charge-pump power supplies 22 and 23 as the power supply 7a. The charge-pump power supplies 22 and 23 are controlled by a load current detector 24 so that the frequency of pump operation is switched between a high frequency fosch, e.g., 800 kHz, and a low frequency foscl, e.g., 10 kHz. The charge-pump power supply 22 of the first stage converts the power voltage Vcc of, for example, 2.5 V used in the logic circuit by multiplying it by two, so as to create the analog power voltage Vdd=5 V and supply it to the data signal line driver 6 and the counter electrode driver 8, as well as the charge-pump power supply 23 of the second stage. The charge-pump power supply 23 uses the power voltage Vdd=5 V to create two voltages Vgh and Vgl for switching ON/OFF the TFT elements, and supplies these voltages Vgh and Vgl to the scanning signal line driver 5. The scanning voltage Vgh is, for example, a ×3 voltage of 15 V, and the non-scanning voltage Vgl is, for example, a ×−2 voltage of −10 V.

Figure 12:
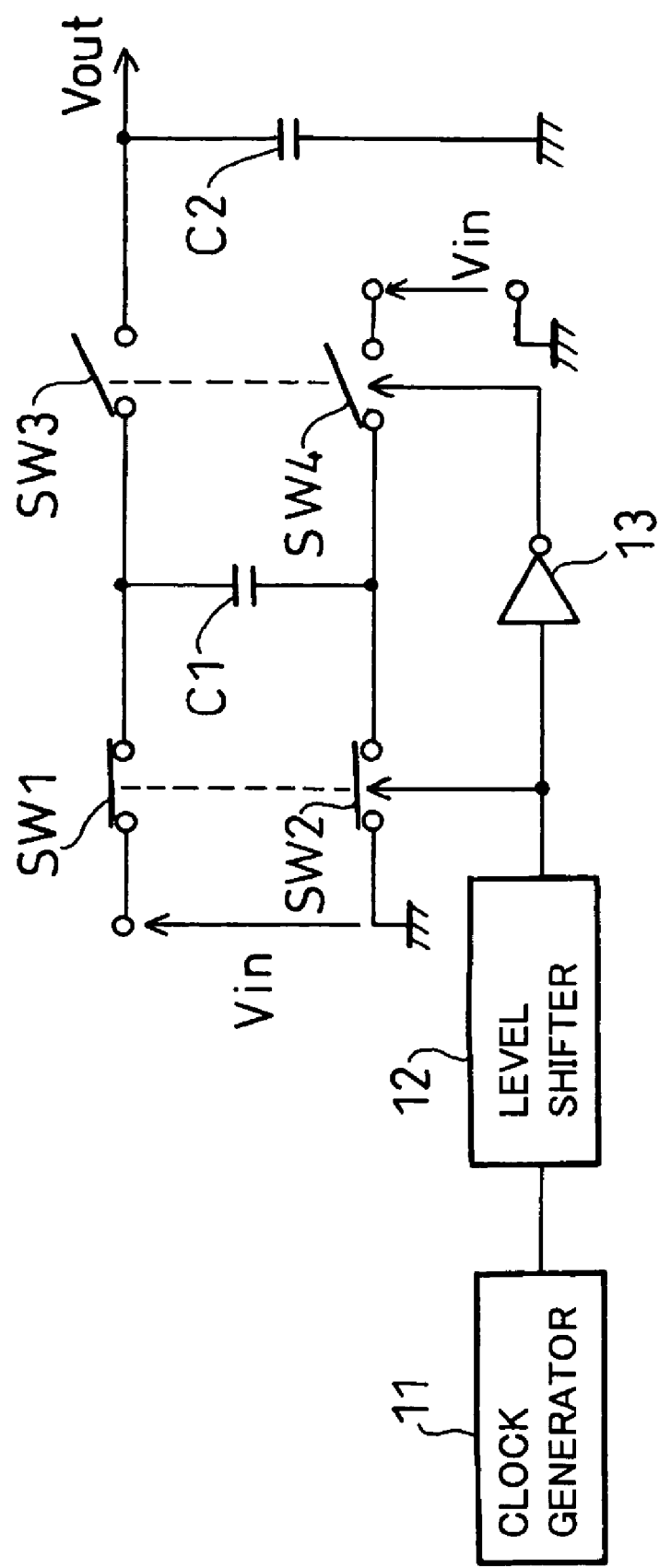
FIG. 12 is a block diagram showing a schematic structure of a charge-pump power supply which creates a ×2 voltage.

FIG. 12 is a block diagram showing a schematic structure of the charge-pump power supply 22 which creates the ×2 voltage. In a capacitor C1 which carries out the pump operation, one terminal (first terminal) receives an input voltage Vin via the switching element SW1, and the other terminal (second terminal) is grounded via the switching element SW2. Further, the first terminal of the capacitor C1 is connected to one terminal of a smoothing capacitor C2 via the switching element SW3, and the other terminal of the capacitor C2 is grounded. Further, the second terminal of the capacitor C1 receives the input voltage Vin via the switching element SW4.

The switching elements SW1 and SW2 in combination carries out ON/OFF operation, and the switching elements SW3 and SW4 in combination carries out ON/OFF operation with the opposite phase to the switching elements SW1 and SW2. Thus, the clock signal of the logic circuit level generated by the clock generator 11 is fed to the switching elements SW1 and SW2 of MOS transistors after its amplitude level is increased by a level shifter 12, and the clock signal is also fed to the switching elements SW3 and SW4 by being inverted by an inverter 13.

The voltage across terminals of the capacitor C1 is charged to Vin while the switching elements SW1 and SW2 are ON and the switching elements SW3 and SW4 are OFF, and the input voltage Vin is added to the voltage Vin of the capacitor C1 while the switching elements SW1 and SW2 are OFF and the switching elements SW3 and SW4 are ON. The voltage 2Vin is outputted in this manner as an output voltage Vout.

Further, in the charge-pump power supply 23, the circuit which creates the scanning voltage Vgh by multiplying the power voltage Vdd by three, and the circuit which creates the scanning voltage Vgl by multiplying the power voltage Vdd by minus two are both charge-pump power supplies and have almost the same structure as that of the charge-pump power supply 22 of FIG. 12.

For example, the ×3 circuit includes two capacitors C1, and switching elements for switching serial connection/parallel connection of the capacitors C1. The capacitors C1 are connected in parallel and the voltage Vin is charged in the capacitors C1 while the switching elements SW1 and SW2 are ON and the switching elements SW3 and SW4 are OFF. The capacitors C1 are switched to serial connection when the switching elements SW1 and SW2 become OFF and the switching elements SW3 and SW4 become ON, and the respective voltages Vin across terminals of the two capacitors C1 are added to the input voltage Vin. As a result, the voltage 3Vin is outputted.

On the other hand, in the ×−2 circuit, as in the ×3 circuit, after the capacitors C1 are charged to Vin, the sum of the voltage Vin across terminals of one of the capacitors C1 and the voltage Vin across terminals of the other capacitor C1 is outputted with the reversed polarity while the switching elements SW1 and SW2 are OFF and the switching elements SW3 and SW4 are ON. Note that, in this case, one terminal of the switching element SW4 is grounded, instead of receiving Vin.

In the preset embodiment, the charge-pump power supplies 22 and 23 are both integrated in a single chip, except for their capacitors C1 and C2. Further, in the present embodiment, in order to simplify the circuit structure and suppress interference or power consumption, the charge-pump power supplies 22 and 23 share the clock generator 11.

Meanwhile, the load current detector 24, which is realized, for example, by a comparator, judges whether the terminal device of the portable phone is in (1) a normal operation state or a scanning mode in a standby state, or (2) a hold mode, based on a voltage across terminals of a current detecting resistance R which is inserted in series in a line of the analog power voltage Vdd. Then, the load current detector 24, according to the result of judgement, outputs a switching control signal CNT which switches the frequency of pump operation of the charge-pump power supplies 22 and 23 between the frequency fosch and the frequency foscl.

The charge-pump power supplies 22 and 23, adapting to the foregoing behavior of the load current which becomes different by more than 100 fold between the scanning mode and the hold mode, decides the frequency fosch of pump operation according to the maximum value 6 mA of the load current, and the circuit elements of the charge-pump power supplies 22 and 23 are set according to the frequency fosch thus decided. For example, capacitance of the capacitor C1 and the smoothing capacitor C2 for the pump operation of the charge-pump power supply of FIG. 12, and element configurations such as L/W of the switching elements SW1 through SW4 of MOSFETs are decided according to the maximum value of the required load current and the frequency foscH at this maximum value. Further, the capacitance and the resistance value of the CR oscillator making up the clock generator 11 are decided according to the frequency foscH. Further, in the circuit structures of the charge-pump power supplies 22 and 23 in which capacitance, a resistance value, and element configurations of the switching elements SW1 through SW4 are decided according to the frequency foscH, such a frequency which does not cause a voltage drop at the expected load current of 40 µA in a hold mode, and is lower than the frequency foscH is decided as the frequency foscL of the hold mode.

Figure 2:
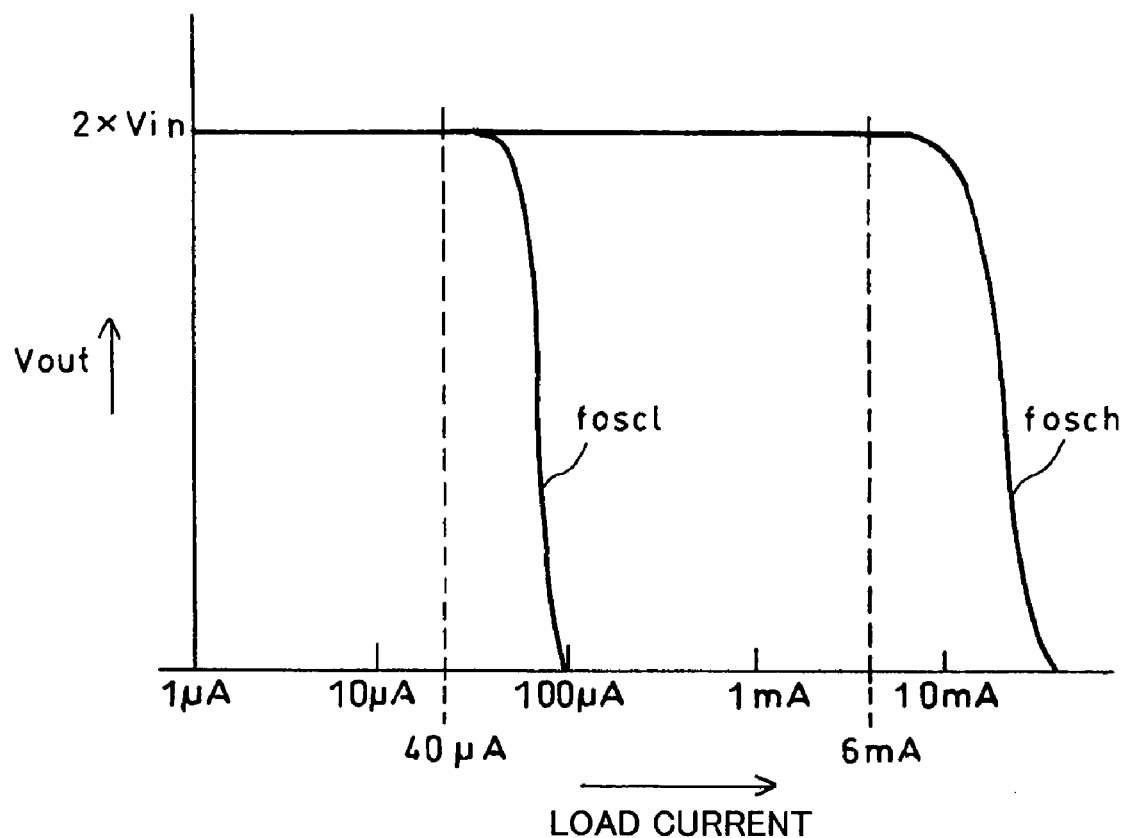
FIG. 2 is a graph explaining output characteristics of a charge-pump power supply.

Generally, conversion efficiency of charge-pump power supplies is greatly influenced by a self-loss of power by the oscillator which decides the frequency fosc of the charge-pump, or the charge-pump power supply itself, such as the leak current of the switching elements SW1 through SW4 during the pump operation, the self-loss of power being proportional to the frequency fosc. The self-loss of power can be reduced by making the fosc smaller. However, since the low frequency foscL causes a significant voltage drop by the load current as shown in FIG. 2, the liquid crystal display device 1 of FIG. 10 uses only the high frequency foscH as the frequency fosc so that there is no voltage drop at the expected load current. On the other hand, in the present embodiment, the low frequency foscL is used in the hold mode so that there is no voltage drop at the expected load current of 40 µA in the hold mode.

Note that, the total power consumption of the image display section including the TFT panel 2 and the drivers 5, 6, and 8 in the hold mode is smaller than the total power consumption of the charge-pump power supplies 22 and 23 and the load current detector 24 in the scanning mode, and therefore, unless the frequency is switched, the influence of power consumption by the charge-pump power supplies 22 and 23 and the load current detector 24 becomes notable.

Figure 3:
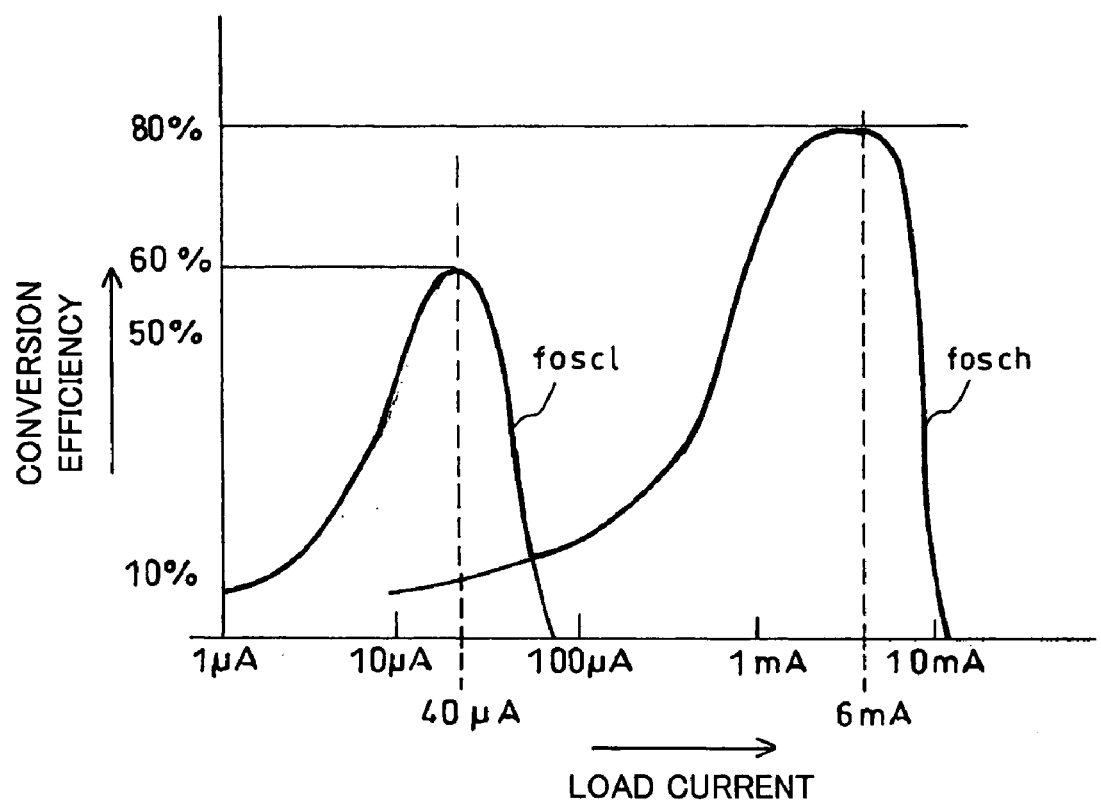
FIG. 3 is a graph showing conversion efficiency characteristics of a charge-pump power supply in accordance with the present invention installed in the liquid crystal display device of FIG. 1.

FIG. 3 is a graph showing conversion efficiency characteristics of the charge-pump power supplies 22 and 23. As shown in FIG. 3, a conversion efficiency as high as 80% can be obtained with the optimized frequency foscH, and, with the reduced self-loss of power, the conversion efficiency is around 60% at the frequency foscL. Thus, the foregoing Equation (4) becomes $$\text{hold mode: } W_{Vcc\,hold} = W_{Vdd\,hold} / 60\% \quad (6)$$
$$= 0.33 \text{ mW}.$$

Therefore, from Equations (3) and (5), when T2:T3=1:14, the total power consumption $W_{Vcc}$ can be reduced to 2.8 mW. This realizes the total standby time of more than 200 hours, as shown in FIG. 9. Note that, in FIG. 3, the bold lines indicate apparent conversion efficiency.

Note that, under normal conditions other than the standby state, by the instructions of the operation mode controller 9, no period (hold mode period T3) longer than the scanning mode period T2 is inserted in the drivers 5, 6, and 8. Thus, the TFT panel 2 is driven with a predetermined vertical scanning period of, for example, 1/60 sec.

FIG. 4 is a waveform diagram explaining operation of the liquid crystal display device 21 having the foregoing structure. In FIG. 4, G1 through G4 indicate respective waveforms of the scanning signal lines G1 through G4, and PS is a waveform of the power save signal PS. These waveforms are the same as the corresponding waveforms of FIG. 11. However, in the present embodiment, while a change in power consumption of the Vdd system as indicated by β2 is the same as α2 of FIG. 11, the power consumption of the Vcc system as indicated by β1 is lower in the hold mode than that indicated by α1 in FIG. 11 by the difference between Equation (4) and Equation (6).

In this manner, a high conversion efficiency can be obtained even at the maximum value of the load current. In addition, a self-loss of power by the charge-pump power supplies 22 and 23 can be reduced by the reduced frequency of the pump operation even under extremely light load of less than 1/100 of the load current, thus obtaining high conversion efficiency.

Further, since the period of hold mode in which power consumption is low is significantly longer on the order of several times to several ten times than that of the scanning mode in which power consumption is high, it is extremely effective, in terms of reducing power consumption under light load, to provide the liquid crystal display device 21 of the active-matrix type having the two operation modes with the charge-pump power supplies 22 and 23, and, in this way, the effect of the charge-pump power supplies 22 and 23 can be maximized. Further, in view of the need to re-apply signals, i.e., to effect the scanning mode at regular intervals to maintain the displayed image, and the fact that the scanning mode and the hold mode are periodically repeated with very small intervals, it is also effective to employ the charge-pump power supplies 22 and 23.

Figure 5:
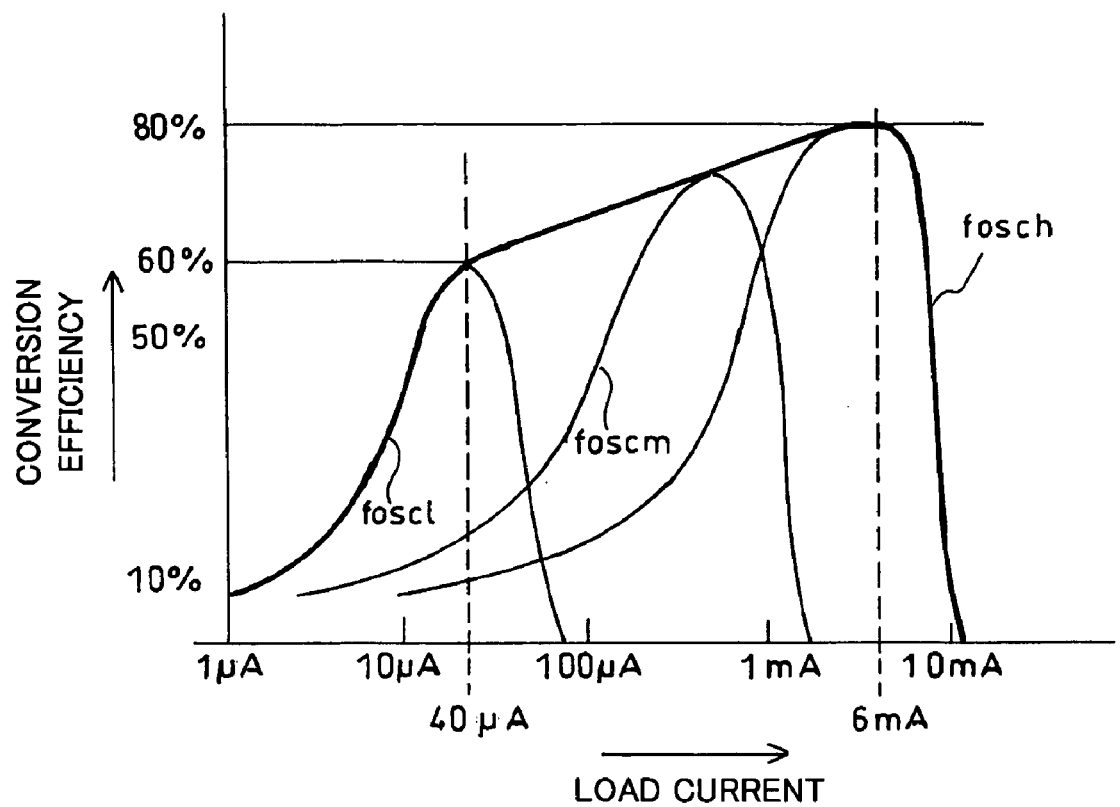
FIG. 5 is a graph showing different conversion efficiency characteristics of the charge-pump power supply in accordance with the present invention.
Figure 8:
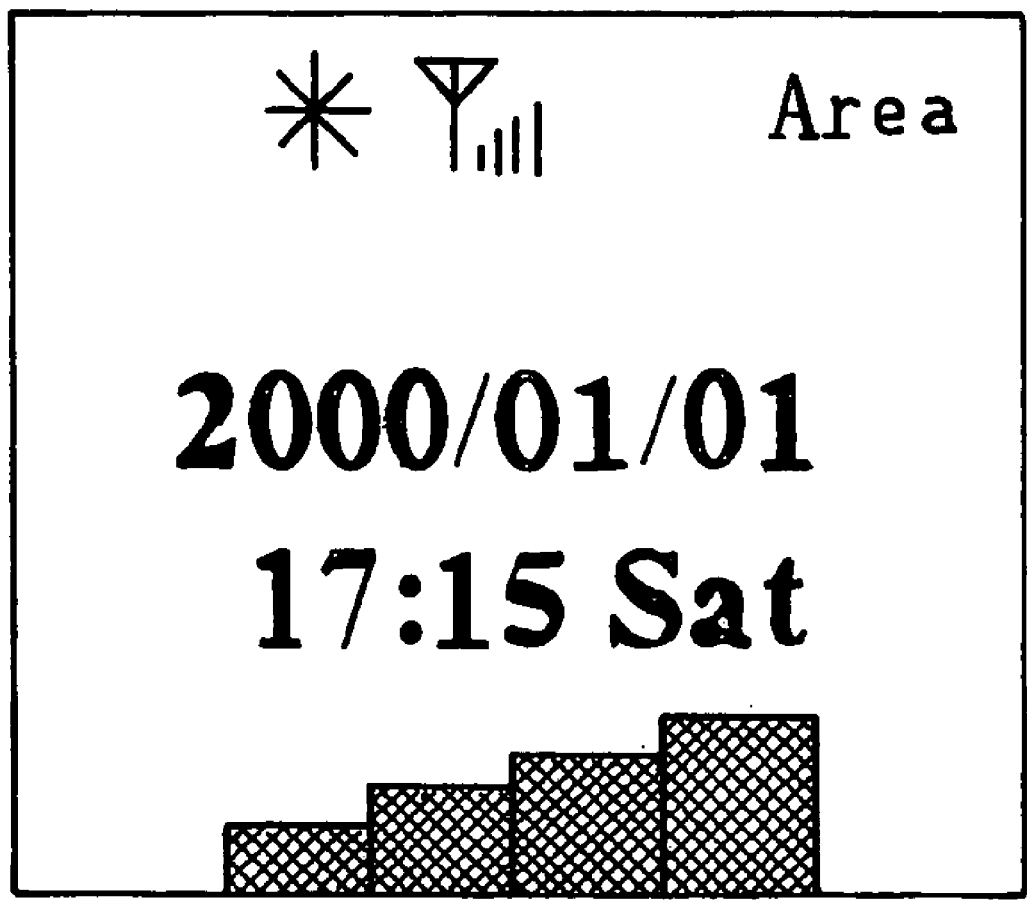
FIG. 8 is a drawing showing an exemplary display during standby of a terminal device of a portable phone.

It is also possible alternatively to provide three or more frequencies fosc of pump operation as shown in FIG. 5, wherein the frequency under normal conditions and in the scanning mode is foscH, the frequency when a date, time, and day of the week are not displayed in FIG. 8 is foscL, and the frequency when a date, time, and day of the week are displayed is foscM, so as to more delicately adapt to the difference in load current in the hold mode. In FIG. 5, the bold line indicates apparent conversion efficiency at various frequencies foscM.

Note that, Japanese Unexamined Patent Publication No. 89356/2000 (published date: Mar. 31, 2000) discloses a power supply of a switching type in which plural pairs of inductors are provided according to a required output current, and the inductors are selectively used with respect to each load mode so as to improve conversion efficiency. However, this differs from the power supply of the present embodiment which is the charge-pump power supply which allows the use of the charge-pump power supplies 22 and 23 of a single structure with respect to a large change of a load current.

Incidentally, in the present embodiment, where lower power consumption is strongly needed such as a standby state, the drivers 5, 6, and 8, according to instructions of the operation mode controller 9, operate to insert the hold mode (T3) of a length longer than the period of the scanning mode T2 so that the vertical scanning period T1 becomes longer than that under normal conditions.

Here, generally, at the re-applied frequency of 30 Hz or above, the response of liquid crystal molecules due to a change in potential of the pixel electrodes is averaged out and is not perceived. However, the re-applied frequency below 30 Hz causes flicker as the viewer perceives the response of the liquid crystal molecules, and display quality is severely impaired.

Figure 14:
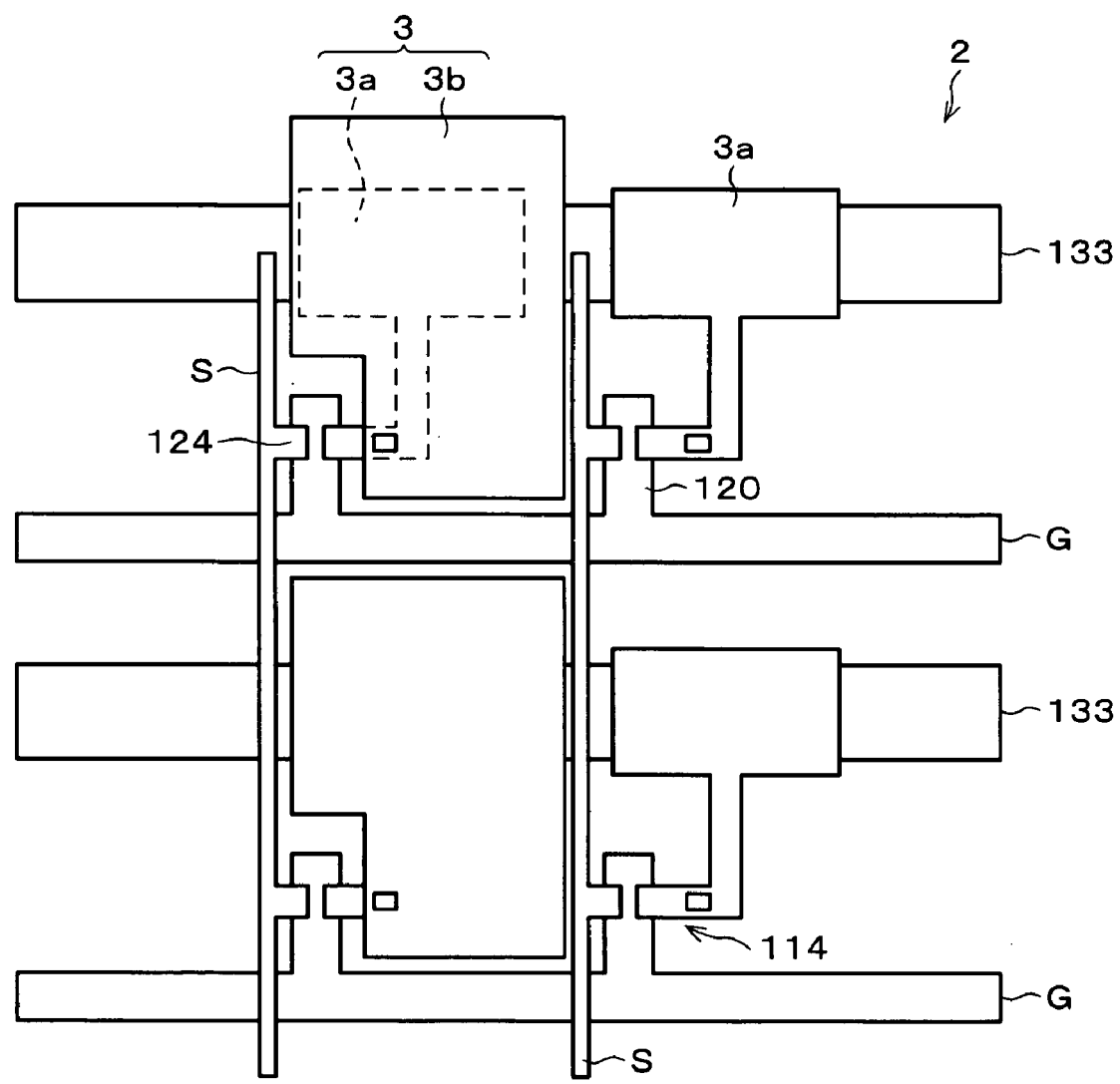
FIG. 14 is a plan view showing an electrode structure of a pixel according to the embodiments of the present invention.

In order to allow normal image display without flicker even in this state, the TFT panel 2 according to the present embodiment includes pixel electrodes and signal lines which are disposed as shown in FIG. 14, differently from the conventional Cs on-gate structure. Note that, FIG. 14 is a view from above the TFT panel 2 beneath a liquid crystal layer.

As shown in FIG. 14, scanning signal lines G which supply scanning signals to gate electrodes 120 of TFT elements 114 and data signal lines S which supply data signals to data electrodes 124 of the TFT elements 114 are provided orthogonal to each other on a glass substrate. There are also provided auxiliary capacitor wires 133 facing auxiliary capacitor electrode pads 3*a*. A pair of auxiliary capacitor electrode pads 3*a* and the auxiliary capacitor wires 133 make up a pair of electrodes which comprises an auxiliary capacitor $C_{CS}$ of a liquid crystal capacitor $C_{LC}$ of a pixel. The auxiliary capacitor wires 133 are provided parallel to the scanning signal lines G on the glass substrate so that a part of the auxiliary capacitor wires 133 is paired with the auxiliary capacitor electrode pads 3*a* with a gate insulating film (not shown) therebetween, on a position other than the area of the scanning signal lines G, i.e., avoiding the scanning signal lines G. This is to prevent, together with the auxiliary capacitor electrode pads 3*a*, capacitive coupling with the scanning signal lines G substantially completely. However, not limiting to this arrangement, the auxiliary capacitor electrode pads 3*a* and the auxiliary capacitor wires 133 may be arranged differently as long as capacitive coupling with the scanning signal line G is prevented substantially completely. Note that, capacitive coupling between the reflector electrodes 3*b* and the scanning signal lines G is sufficiently small and is negligible.

In the TFT panel 2 having the foregoing structure, a fluctuation of voltage due to a noise added to the voltage applied to the liquid crystal capacitor $C_{LC}$ from the scanning signal lines G in response to the supply of the scanning signals is suppressed below the value (here, 3 V) which causes flicker on a display perceived by the viewer. Therefore, by inserting the hold mode period T3, a high display quality with reduced flicker can be maintained even when the TFT panel 2 is driven with a long vertical scanning period T1 of, for example, 33.4 msec to 2 sec, which is more preferably 66.7 msec to 1 sec, and further preferably several hundred msec.

Further, during a non-scanning period including the hold mode period T3, all the data signal lines S are disconnected from the signal line driver 6 to bring the signal line driver 6 in a high-impedance state. In this way, the potential of each data signal line S can be maintained constant in a non-scanning period. As a result, it is possible to prevent a change in state of stored data of each pixel, which is caused by a potential fluctuation of the data signal line S, such as a potential fluctuation of the pixel electrode 3 due to capacitive coupling between the data signal line S and the pixel electrode 3, thus desirably suppressing flicker. In effect, power consumption can be lowered sufficiently, and at the same time, a high display quality with a sufficiently reduced level of flicker can be realized.

Further, when operations of analog circuits in a buffer of the data signal line driver 6 are inactivated to reduce power consumption, the buffer comes to have a ground potential. As a result, the data signal lines S connected to the buffer also become a ground potential, and this causes a potential change of the pixel electrode 3 due to capacitive coupling. To prevent this, operations of those analog circuits which do not play role in the display of the non-scanning period are inactivated after all data signal lines are brought to a high-impedance state. In this way, a change in state of stored data of a pixel can be suppressed, and an even higher display quality with a sufficiently reduced level of flicker can be realized while reducing power consumption of the analog circuits.

Further, it is more preferable to bring all data signal lines to a high-impedance state after having a potential from which changes of data storing state of all pixels are on average substantially minimum. For example, in a structure where liquid crystal is placed between the pixel electrodes 3 and the counter electrodes, all data signal lines are set to the mean potential of an amplitude of an AC voltage in the case of applying an AC voltage to the counter electrodes, or they are set to the potential of the counter electrodes in the case of applying a DC voltage to the counter electrodes. In this case, even when pixels of positive potential and pixels of negative potential coexist in AC driving, changes in state of stored charge, i.e., stored data, of all pixels due to capacitive coupling between the data signal lines S and the pixel electrodes 3 are averaged and become substantially minimum. As a result, even when a state of stored data of pixels differ line by line, a change in state of stored data becomes substantially minimum in a screen as a whole, and a high display quality with even less flicker can be realized.

Figure 6:
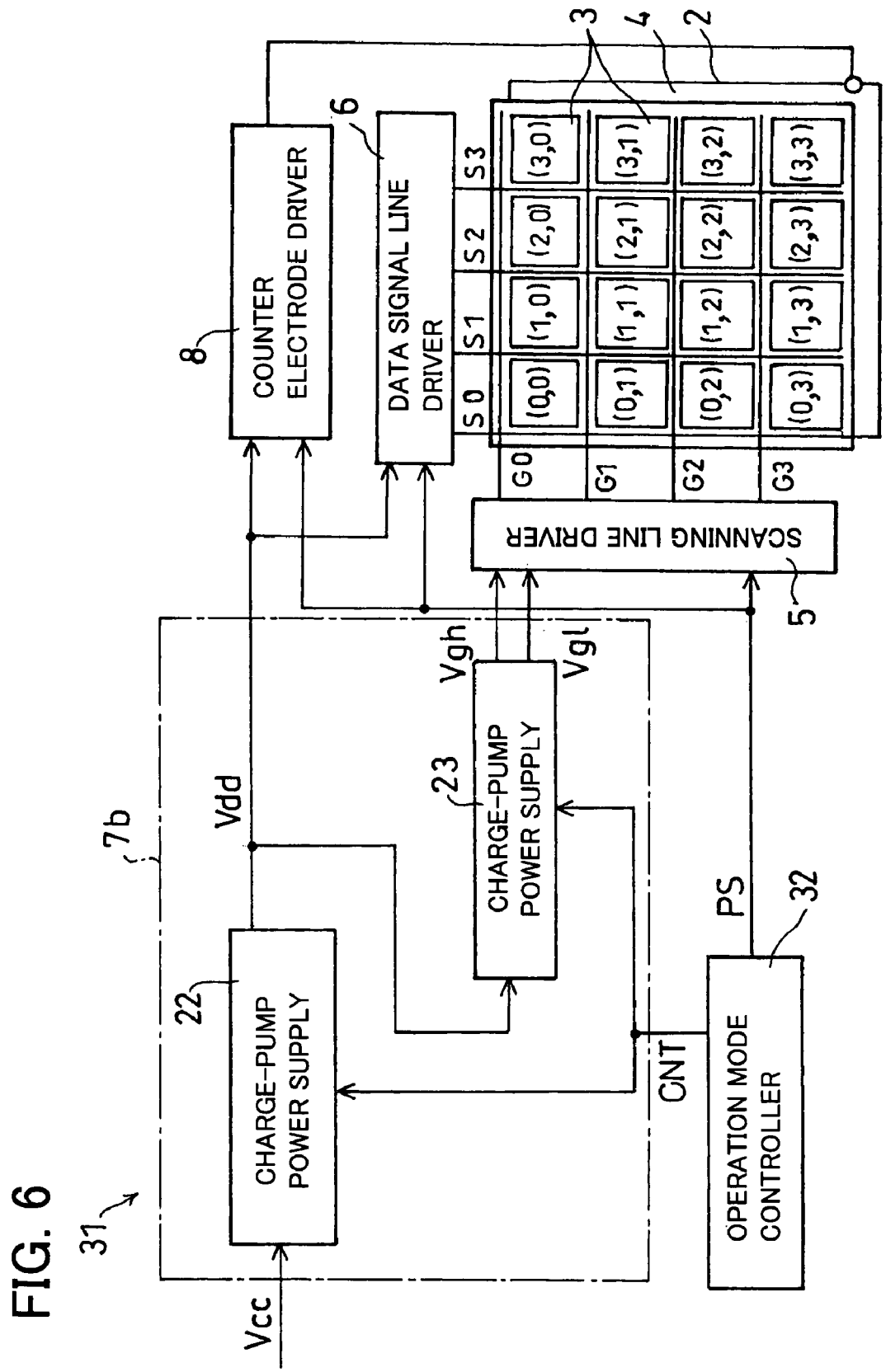
FIG. 6 is a block diagram showing an electrical structure of a liquid crystal display device of another embodiment of the present invention.
Figure 7:
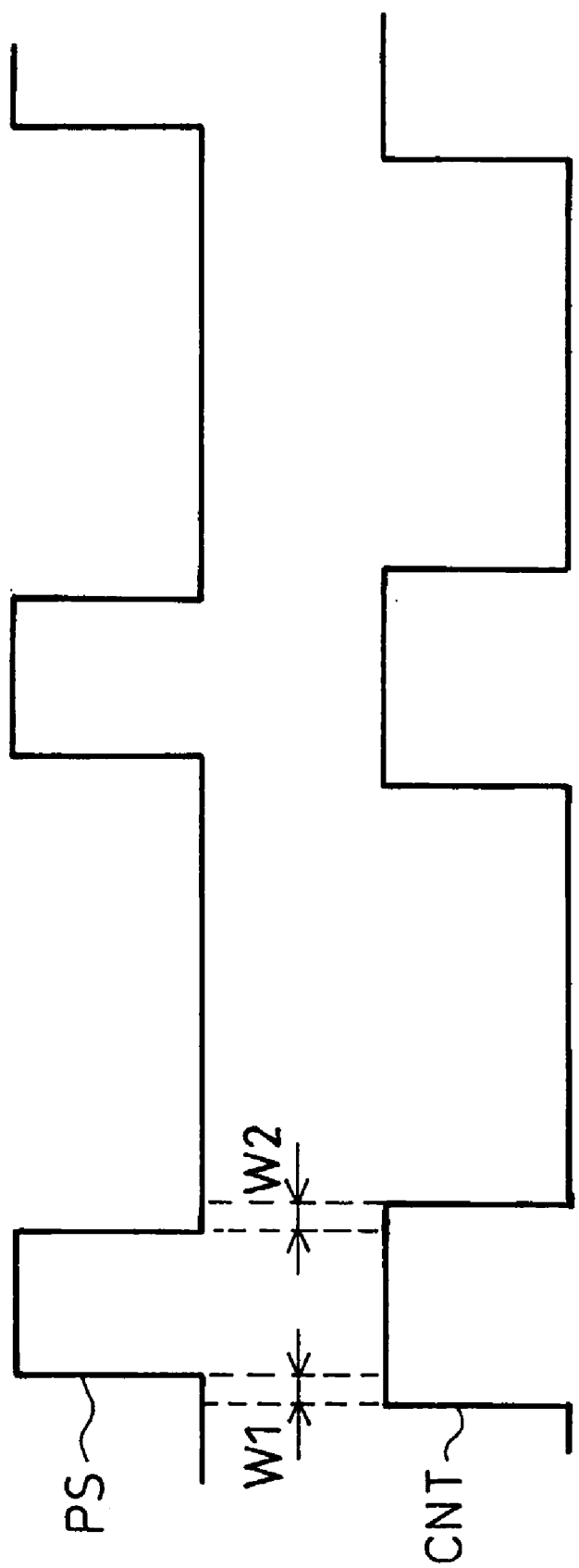
FIG. 7 is a waveform diagram explaining operation of an operation mode controller of the liquid crystal display device of FIG. 6.

The following will describe another embodiment of the present invention with reference to FIG. 6 and FIG. 7.

FIG. 6 is a block diagram showing an electrical structure of a liquid crystal display device 31 of another embodiment of the present invention. The liquid crystal display device 31 is similar to the liquid crystal display device 21, and corresponding elements are given the same reference numerals and explanations thereof are omitted here. What is significant about the liquid crystal display device 31 is that an operation mode controller 32 which outputs the power save signal PS for switching the operation modes of the scanning signal line driver 5, the data signal line driver 6, and the counter electrode driver 8 between the scanning mode and the hold mode functions as frequency switching means, and outputs the control signal CNT for switching frequencies of the charge-pump power supplies 22 and 23.

Thus, the operation mode controller 32 can detect switching of operation modes in advance. Utilizing this, when the frequency is increased from the hold mode to the scanning mode, the operation mode controller 32 switches the frequency before the operation mode is switched, and, when the frequency is decreased from the scanning mode to the hold mode, switches the frequency at the time when or after the operation mode is switched.

That is, as shown in FIG. 7 in which PS indicates the power save signal PS, the timing of rise of the control signal CNT, as indicated by CNT, is set to lead the power save signal PS by a predetermined time interval W1. The time interval W1 is selected so that the frequency change is completed at the start of switching of operation modes of each load circuit by the power save signal PS. Further, the timing of fall of the control signal CNT is set to lag by a time interval W2 (W2$\geq$0). In this way, there will be no deficiency of the operation current.

Note that, in the foregoing descriptions, the load current differed by more than 100 times between the scanning mode and the hold mode. However, depending on the size of the TFT panel or the display content during standby, the difference may be about 10 times. The present invention can suitably adapt to such a large change of the load current by more than 10 times using the charge-pump power supplies 22 and 23 of a single structure according to the operation mode, simply by switching the frequency of the pump operation.

That is, the power supply 7a (7b) according to the present embodiment is a charge-pump circuit which supplies power to a group of load circuits with a plurality of operation modes in which a large load current change of more than 10 times is caused, wherein the frequency of pump operation is decided according to the maximum value of operation currents of the group of load circuits, and circuit elements of the power supply are set according to this frequency. Further, the frequency is switched according to the operation mode of the group of load circuits.

With this arrangement, in addition to obtaining high conversion efficiency even at the maximum value of the operation currents, it is also possible, by the reduced frequency of the pump operation, to reduce a self-loss of power in the power supply, such as the leak current by the MOSFET, or the power consumed by the CR oscillator, even under extremely light load, thus obtaining high conversion efficiency.

Incidentally, the power supply 7a (7b) of the liquid crystal display device 21 (31) multiplies the power voltage Vcc used in the logic circuit (not shown) by a constant factor (e.g., ×2, ×6, or ×-4), so as to generate the power voltages Vdd, Vgh, and Vgl to be supplied to the drivers 5, 6, and 8 of the TFT panel 2.

Figure 15:
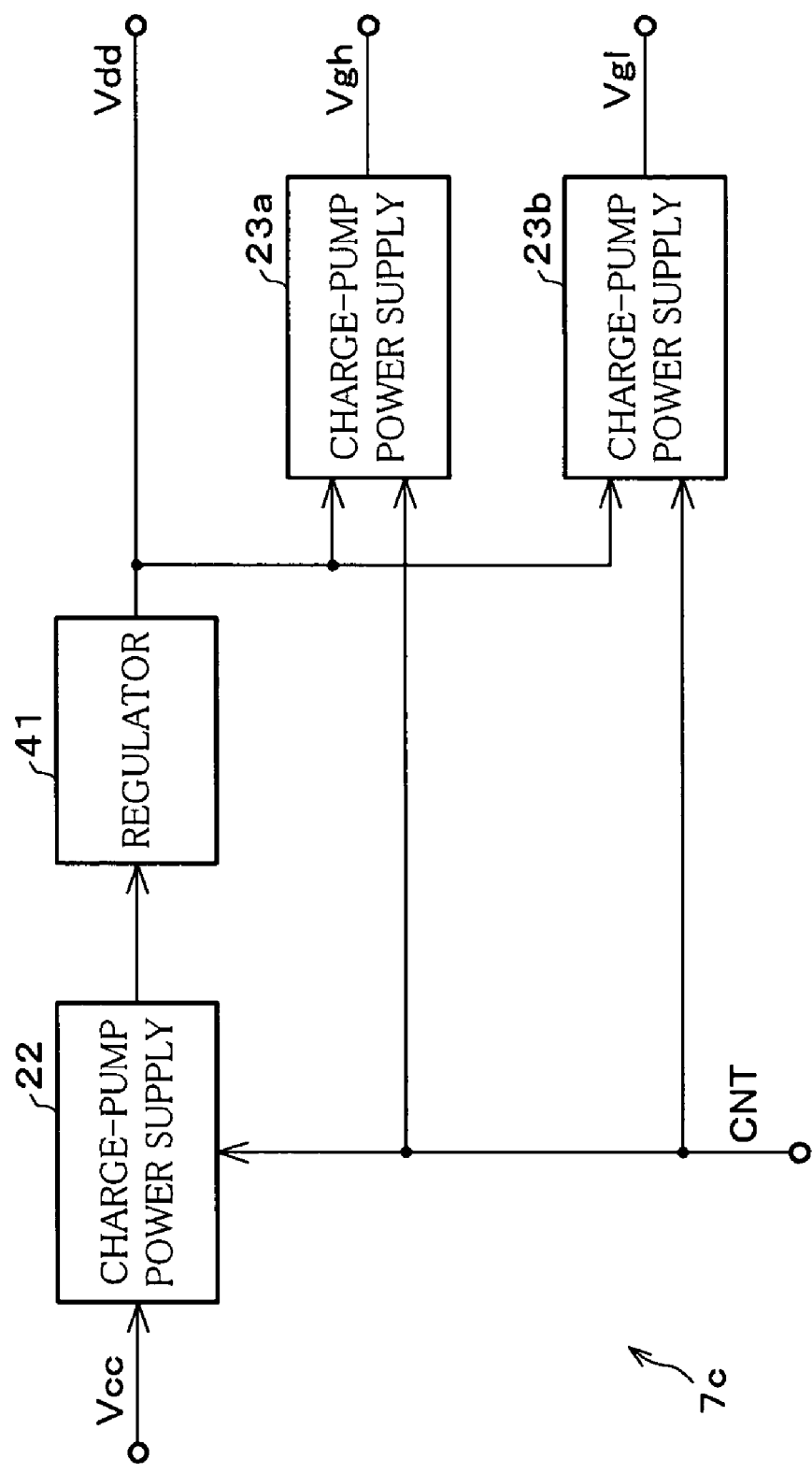
FIG. 15 is a block diagram showing a main structure of a power supply as a modification example of the liquid crystal display device according to the embodiments of the present invention.

On the other hand, the liquid crystal display device according to the present modification example uses the power supply 7c as shown in FIG. 15, instead of the power supply 7a (7b) so that liquid crystal display devices of a common circuit structure can be used among systems having different power voltages Vcc of the logic circuits. The power supply 7c includes, in addition to the charge-pump power supplies 22 and 23 of the power supply 7a (7b), a regulator 41 which outputs the output voltage of the charge-pump power supply 22 as the power voltage Vdd after stabilizing it. Further, the charge-pump power supplies 23a and 23b, which are provided as the charge-pump power supply 23, multiply the power voltage Vdd, which is the output of the regulator 41, by a predetermined constant factor (e.g., ×3 or ×-2) so as to output the power voltages Vgh and Vgl.

Figure 16:
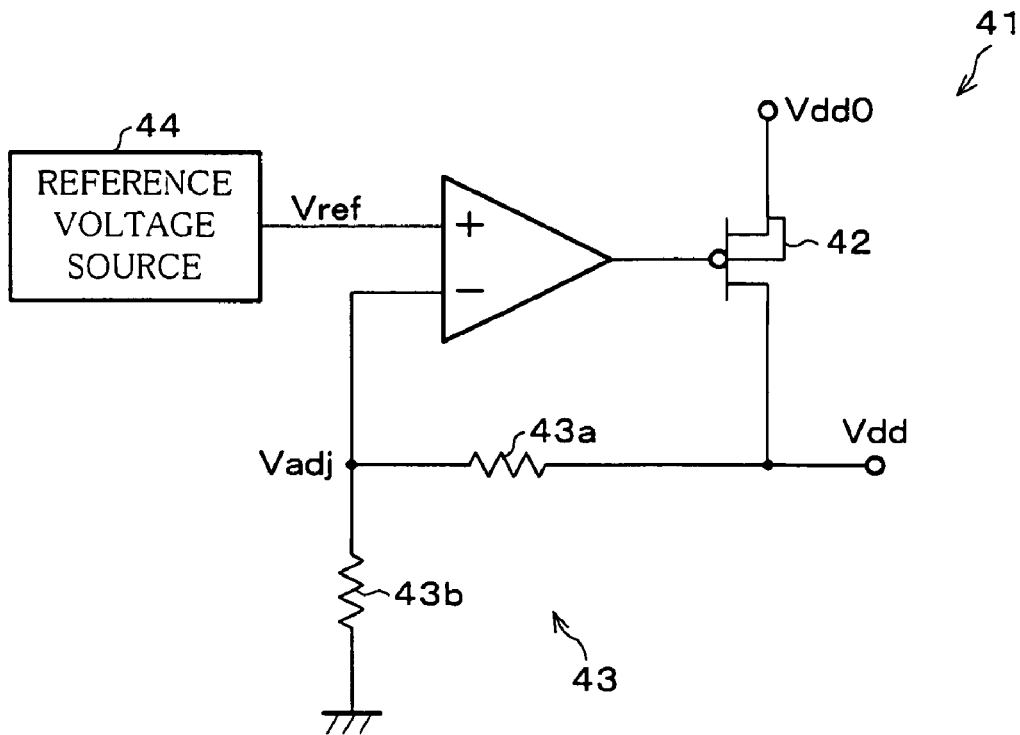
FIG. 16 is a circuit diagram showing an exemplary structure of a regulator provided in the power supply.

The regulator 41 according to the present modification example is a series regulator, and includes, for example, as shown in FIG. 16, an FET 42 which is disposed between an input and an output of the regulator 41, a voltage divider 43 for dividing the output voltage Vdd to generate a feedback voltage Vadj, a reference voltage source 44 for generating a predetermined reference voltage Vref, and a differential amplifier 45 which compares the reference voltage Vref and the feedback voltage Vadj to drive a gate of the FET 42.

The reference voltage source 44 operates by a power voltage which may be the power voltage Vcc or an output voltage Vdd0 of the charge-pump power supply 22. The reference voltage Vref can be generated without any problem even when these voltages differ from system to system including the liquid crystal display device 21 (31).

The voltage divider 43 is a series circuit which is disposed between a terminal of the output voltage Vdd and a ground terminal, and includes resistances 43a and 43b. The dividing ratio of the voltage divider 43 is set so that the feedback voltage Vadj becomes the reference voltage Vref when the output voltage Vdd reaches a target value.

Thus, the equivalent resistance value of the FET 42 is controlled so that the voltages Vadj and Vref become equal to each other, and the output voltage Vdd of the regulator 41 is stabilized to a value which is set according to the reference voltage Vref and the dividing ratio.

The output voltage Vdd is supplied to the drivers 5, 6, and 8 of the TFT panel 2, and used as an analog power supply, for example, in a tone voltage generator for tone display or a driver of common electrodes. The output voltage Vdd is then raised three times by the charge-pump power supply 23a, and applied to the scanning signal line driver 5 as the scanning voltage Vgh for switching ON the TFT elements of the TFT panel 2. Further, the charge-pump power supply 23b multiplies the output voltage Vdd by ×-2, and supplies it to the scanning signal line driver 5 as the operation voltage Vgl for switching OFF the TFT elements.

Here, the voltage, such as the power voltage of the logic circuit (not shown), supplied to the liquid crystal display device 21 (31) does not always take the foregoing value (2.5 V), and may vary depending on the system including the liquid crystal display device 21 (31). Currently, there are various systems with a power voltage in a range of 2.7 V to 3.6 V, for example, including a system with the power voltage Vcc of 2.7 V and a system with the power voltage of 3.6 V.

In such a case, while it may be possible with the power supply 7a or 7b of FIG. 1 or FIG. 7 to properly supply the power voltages (e.g., Vdd=5 V, Vgh=15 V, and Vgl=-10 V) to the drivers 5, 6, and 8 in the system employing the foregoing power voltage Vcc (e.g., 2.5 V), they cannot be properly supplied to the drivers 5, 6, and 8 in other systems with the power voltage Vcc of, for example, 2.7 V, and as a result the TFT panel 2 cannot maintain stable display. Therefore, in order to effect stable display also in these systems, there is need to manufacture the liquid crystal display device 21 (31) with the power supply 7a (7b) specifically for these systems.

On the other hand, with the power supply 7c according to the present modification example, the drivers 5, 6, and 8 can be supplied with the power voltages Vdd, Vgh, and Vgl which allow stable display on the TFT panel 2 even when the power voltage Vcc varies.

Further, since the regulator 41 is provided after, not before, the charge-pump power supply 22, the fluctuation of power voltage due to the charge-pump power supply 22 does not appear on the power voltage Vdd, Vgh, or Vgl. Thus, power voltages can be supplied more stably.

Further, the sole regulator 41 is provided between the charge-pump power supply 22 and the charge-pump power supplies 23a and 23b. Thus, the power voltage Vdd, which needs most stability, can be stabilized without fail, despite the fact that the circuit structure is simpler than the structure in which the regulator 41 is provided after and for each of the charge-pump power supplies 22, 23a, and 23b. Note that, since the level of stability required for the power voltages Vgh and Vgl is not as high as that required for the power voltage Vdd, a high display quality can be maintained by the charge-pump power supplies 23a and 23b even when a small noise enters the power voltages Vgh and Vgl.

Incidentally, the clock generator 11 as shown in FIG. 12 may generate the frequency foscal, foscl, or foscm, provided that the clock generator 11 can output a clock signal of frequency fosc according to the frequency control signal CNT. Further, the clock generator 11 may receive the clock signals of the respective frequencies partially or entirely from outside, and output either the externally supplied clock signal or the internal clock signal upon selection.

However, when the externally supplied clock signal is a fast clock signal, it must travel a longer distance compared with the internally generated clock signal. This increases the capacitive load such as a wiring capacity of the substrate, and, in turn, the power required to transfer the clock signal. Further, in order to drive a transfer line of the clock signal, a buffer with a large driving capability will be required. As a result, power consumption of the entire system, including the liquid crystal display device 21 (31), is increased.

Figure 17:
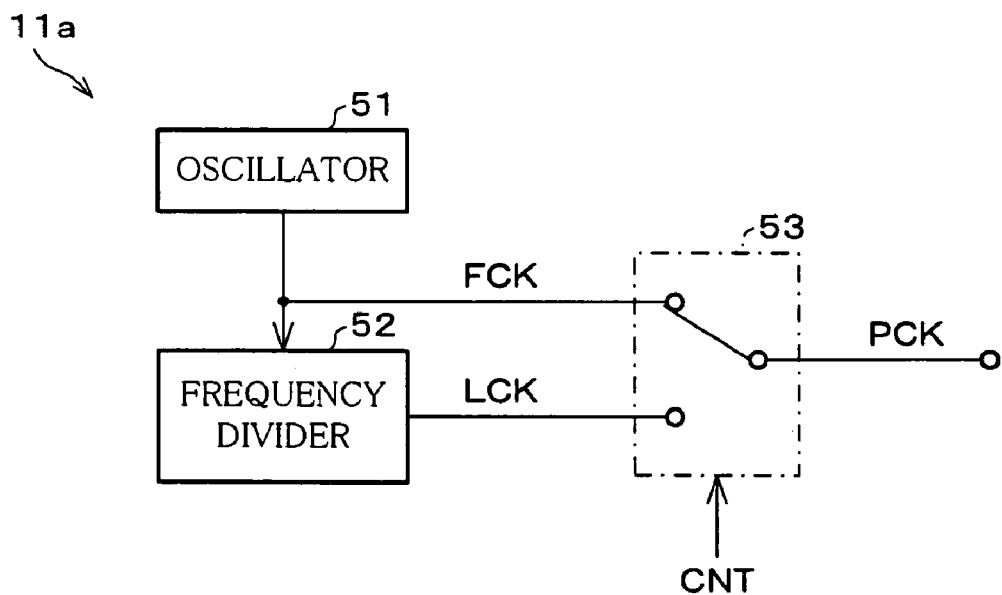
FIG. 17 is a block diagram showing a main structure of a clock generator provided in the power supply according to another modification example of the present invention.
Figure 19:
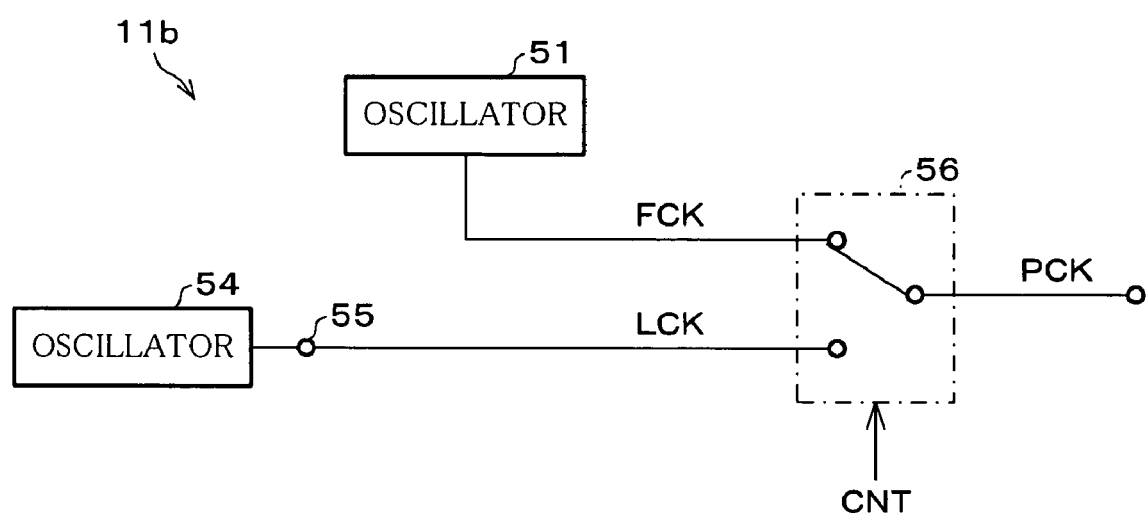
FIG. 19 is a block diagram showing a main structure of a clock generator provided in the power supply according to still another modification example of the present invention.

It is therefore preferable that the clock generator 11 includes an oscillator 51 for generating high frequency foscl, for example, such as a clock generator 11a or 11b as shown in FIG. 17 or FIG. 19.

For example, the clock generator 11a as shown in FIG. 17 is a circuit which generates the respective frequencies (e.g., fosch and foscl) internally, and includes, in addition to the oscillator 51, a frequency divider 52 for dividing an output signal of the oscillator 51 to generate a clock signal of frequency foscl, and a switch 53 for selecting one of output signals of the oscillator 51 and the frequency divider 52 to output it as the output signal of the clock generator 11a.

Figure 18:
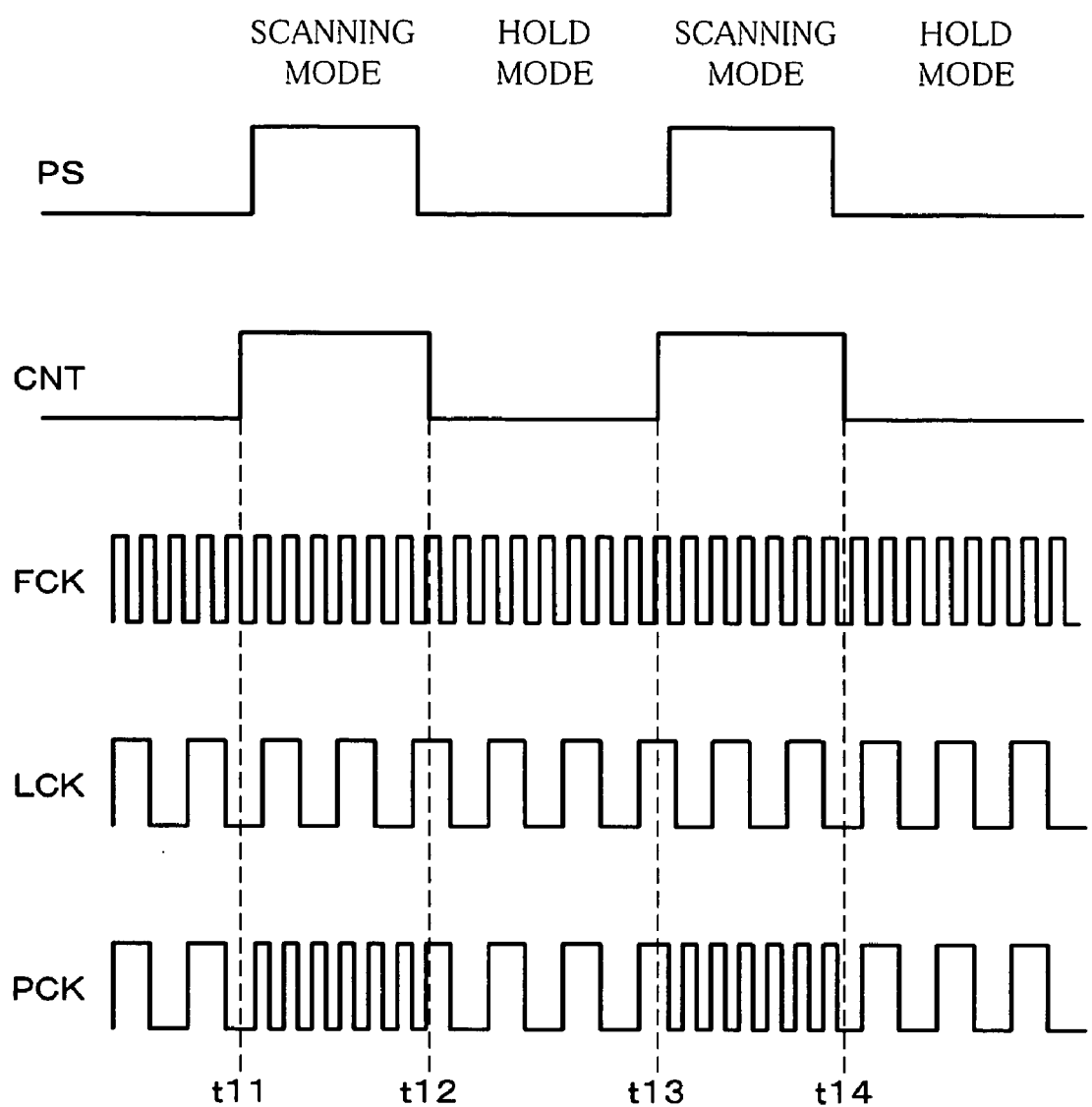
FIG. 18 is a waveform diagram explaining operation of the clock generator.

According to this arrangement, as shown in FIG. 18, the oscillator 51 outputs a clock signal FCK of frequency fosch, and the frequency divider 52 outputs a clock signal LCK of frequency foscl. Further, as in the liquid crystal display device 21 (31) as shown in FIG. 1 or FIG. 6, the switch control signal CNT varies with the power save signal PS which indicates a scanning mode or a hold mode. Note that, as in FIG. 7, FIG. 18 and FIG. 20 (described later) show a timing at which the operation mode controller 32 generates the switch control signal CNT.

During a period (period from t11 to t12) in which the switch control signal CNT indicates a scanning mode (frequency fosch), the switch 53 selects the oscillator 51. As a result, the output, the clock signal PCK, of the clock generator 11a becomes a signal of frequency fosch. On the other hand, during a period (period from t12 to t13) in which the switch control signal CNT indicates a hold mode (frequency foscl), the switch 53 indicates the frequency divider 52. As a result, the frequency of the clock signal PCK becomes the frequency foscl.

Meanwhile, the clock generator 11b as shown in FIG. 19 is a circuit which receives the clock signal from outside and internally generates only the clock signal of high frequency fosch, and includes in addition to the oscillator 51, a terminal 55 for receiving a clock signal from an external oscillator 54, and a switch 56 for selecting the output terminal of the oscillator 51 or the terminal 55 to output the output signal of the clock generator 11b. Further, the oscillator 51 is inactivated when the switch control signal CNT is indicating the frequency of the externally supplied clock signal.

Figure 20:
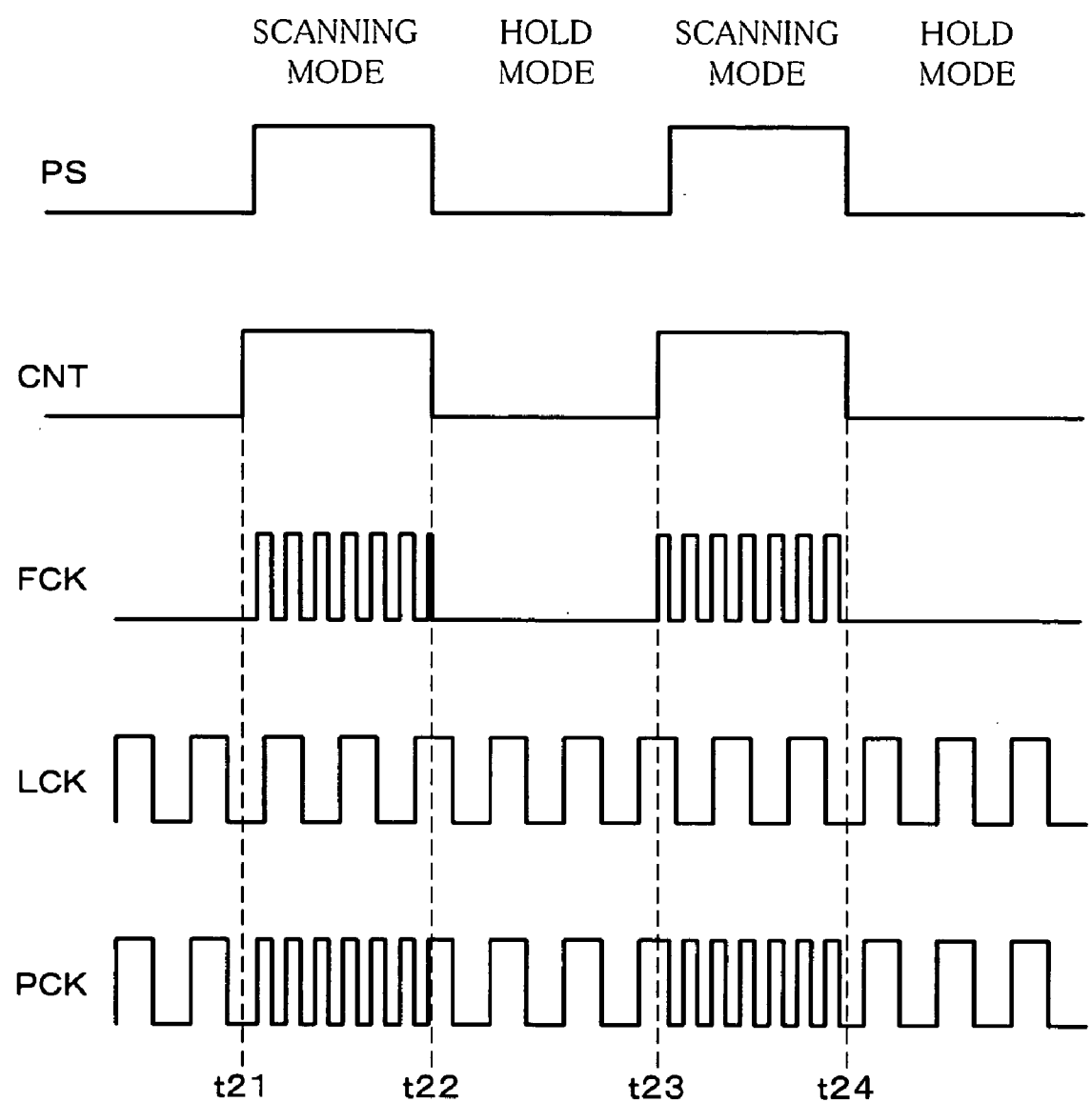
FIG. 20 is a waveform diagram explaining operation of the clock generator.

In this arrangement, as shown in FIG. 20, the terminal 55 supplies the clock signal LCK of frequency foscl, and, as with the liquid crystal display device 21 (31), the switch control signal CNT varies with the power save signal PS which indicates a scanning mode or a hold mode.

During a period (period from t21 to t22) in which the switch control signal CNT indicates frequency fosch, the oscillator 51 comes into operation and outputs the clock signal FCK of frequency fosch, and the switch 56 selects the oscillator 51. As a result, the output, the clock signal PCK, of the clock generator 11b becomes a signal of frequency fosch. On the other hand, during a period (period from t22 to t23) in which the switch control signal CNT indicates frequency foscl, the switch selects the terminal 55. As a result, the frequency of the clock signal PCK becomes the frequency foscl. Further, during this period, the oscillator 51 is inactivated and no power is consumed.

Note that, the foregoing explained the case where the clock generator 11a (11b) outputs clock signals of two frequencies, but clock signals of three or more frequency levels may be outputted as well. For example, the dividing ratio of the frequency divider 52 as shown in FIG. 17 is varied according to the switch control signal CNT. Further, in the case of the clock generator 11b of FIG. 19, the clock signal of the intermediate frequency may be supplied from outside, as with the frequency foscl, or may be generated internally, for example, by providing a frequency divider, as with the clock generator 11a.

According to this arrangement, since the clock generators 11a and 11b include the oscillator 51, the distance travelled by the fast clock signal can be made shorter than the case where the fast clock signal is supplied externally from outside of the power supplies 7a through 7c. As a result, the capacitive load can be reduced and the buffer can be omitted, thus reducing power consumption of the entire system including the liquid crystal display device 21 (31).

Further, in the structure as shown in FIG. 19, since the slow clock signal is externally supplied, the oscillator 51 can be inactivated while the clock generator 11b is outputting the slow clock signal, thus reducing power consumption of the clock generator 11b than that of the clock generator 11a. Note that, the system including the liquid crystal display device 21 (31) uses clock signals of various frequencies for deciding operating timings of respective circuits, for example, such as the sampling timing of the video signal. Therefore, by using oscillators of these clock signals as the oscillator 54, the power supplies 7a through 7c can be driven with lower frequencies, without increasing the number of oscillators in the system. Note that, in this case, since the frequency is low, power consumption can be reduced more than that with the fast clock, even when the distance travelled by the clock signal is long.

Figure 21:
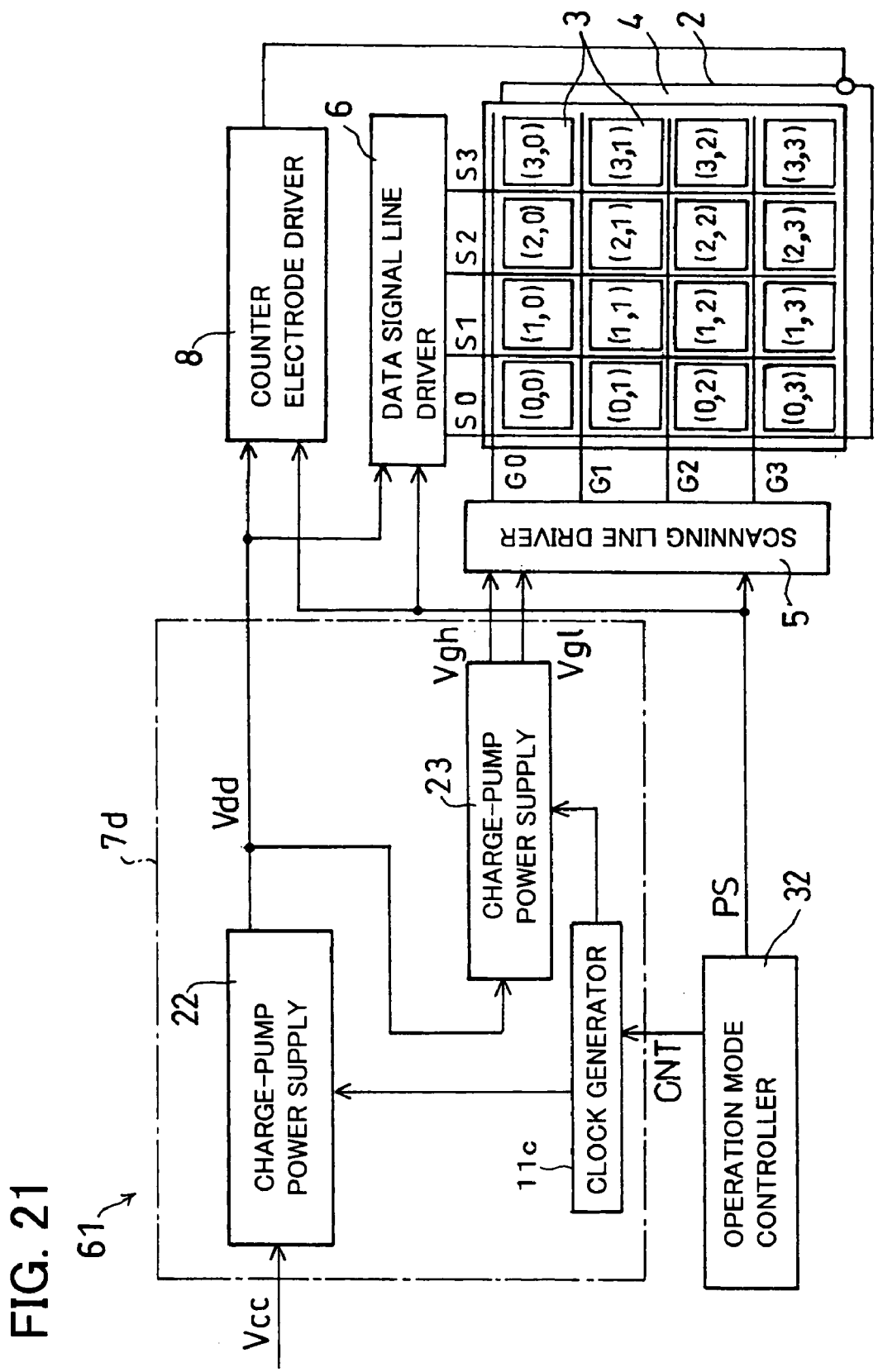
FIG. 21 is a block diagram showing an electrical structure of a liquid crystal display device according to yet another embodiment of the present invention.
Figure 22:
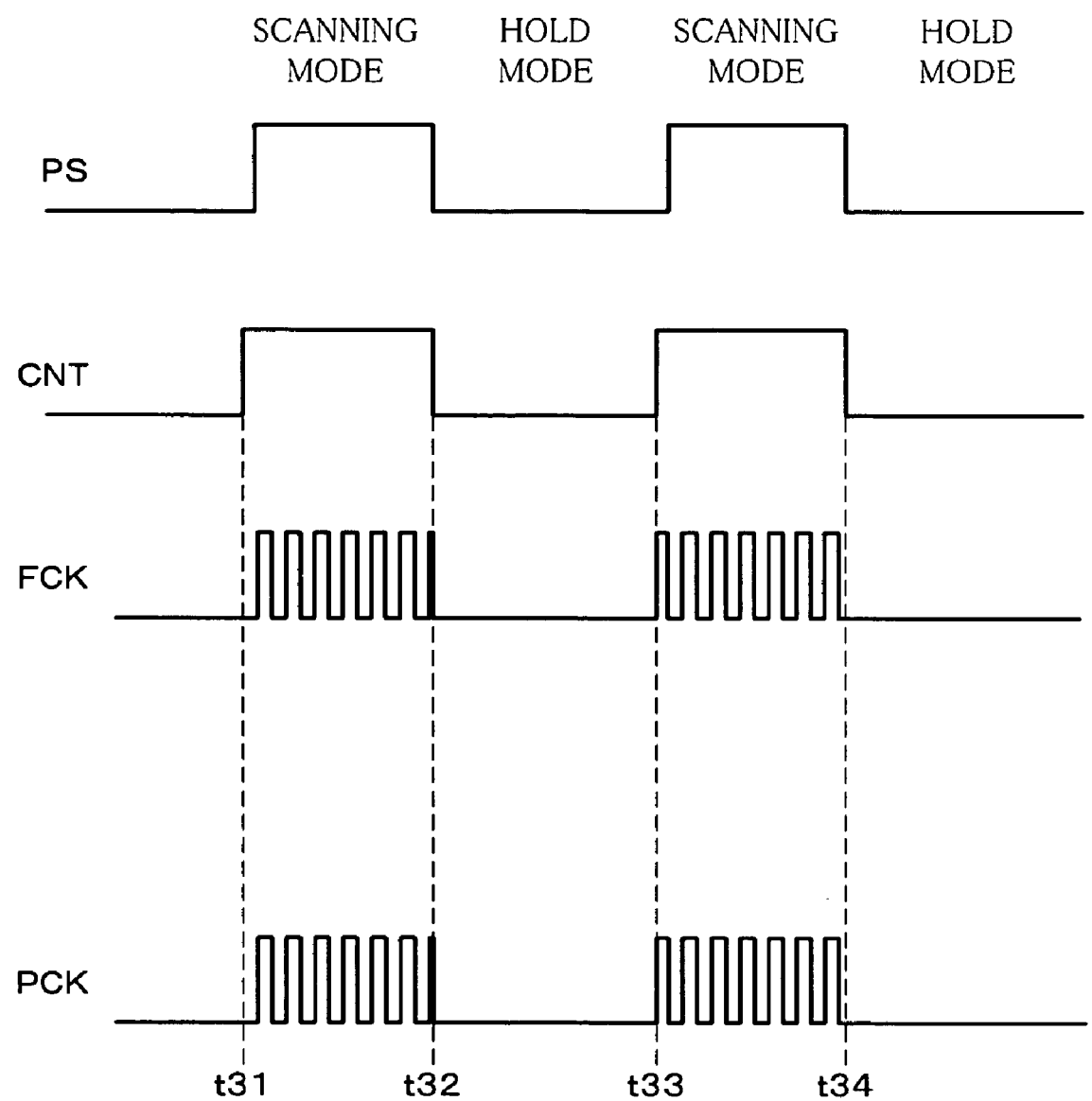
FIG. 22 is a waveform diagram explaining operation of a clock generator provided in the liquid crystal display device.

The following will describe yet another embodiment of the present invention with reference to FIG. 21 and FIG. 22.

FIG. 21 is a block diagram showing an electrical structure of a liquid crystal display device 61 of the present embodiment. The liquid crystal display device 61 is similar to the liquid crystal display device 31, and corresponding elements are given the same reference numerals and explanations thereof are omitted here. Note that, while the load current detector 24 may generate the switch control signal CNT as in FIG. 1, FIG. 21 shows a more suitable example in which the operation mode controller 32 generates the switch control signal CNT.

What is significant about the liquid crystal display device 61 is that the power consumption in the hold mode of the drivers 5, 6, and 8 can be maintained at the power voltages Vdd, Vgh, and Vgl by the smoothing capacitor (capacitor C2 shown in FIG. 12) of the charge-pump power supplies 22 and 23, and the charge-pump power supplies 22 and 23 of the power supply 7d, which is provided in place of the power supply 7b, stop their pump operations during the hold mode.

More specifically, in the hold mode, the load current of the power supply 7d, such as the power consumption of the drivers 5, 6, and 8, is set to be not more than 0.01 times the load current of the scanning mode. Further, the repetitive period of the hold mode and the scanning mode is set to several hundred msec. Further, the clock generator 11c includes the oscillator 51 similar to that shown in FIG. 19, and can output an output signal CK of the oscillator 51 as the output signal PCK of the clock generator 11c. Note that, in the present embodiment, the charge-pump power supplies 22 and 23 share the clock generator 11 (FIG. 12), and, for convenience of explanation, the clock generator 11c, which operates as the clock generator 11, is shown outside of the charge-pump generators 22 and 23 in FIG. 21.

According to this arrangement, as shown in FIG. 22, the switch control signal CNT varies with the power save signal PS as with FIG. 18. The oscillator 51 of the clock generator 11*c* comes into operation during a period (period from t31 to t32) in which the switch control signal CNT indicates frequency fosch. Thus, the frequency of the output signal PCK of the clock generator 11*c* becomes the frequency fosch.

On the other hand, when the power save signal PS indicates the hold mode and the switch control signal CNT is switched, the oscillator 51 is inactivated. As a result, the output signal PCK of the clock generator 11*c* becomes a constant voltage. In this state, the oscillator 51 is inactivated. Further, pump operations of the charge-pump power supplies 22 and 23 are inactivated as well. As a result, the power consumption of the charge-pump power supplies 22 and 23 is lower than that in the liquid crystal display device 21 (31).

Here, in the foregoing state, since the pump operations of the charge-pump power supplies 22 and 23 are inactivated, in the event where the load current is high and the hold mode is long, the output voltages (Vdd, Vgh, and Vgl) of the power supply 7*d* drop significantly and approach ground potential even when the smoothing capacitor (capacitor C2 in FIG. 12) is provided. In this case, the drivers 5, 6, and 8, which are the load circuit of the power supply 7*d*, cannot display an image property on the TFT panel 2.

However, the load current in the hold mode is not more than 0.01 times than that in the scanning mode, and the repetitive period of the two modes is several hundred msec. Thus, the output voltages can be maintained by the respective smoothing capacitors (C2 of FIG. 12) of the charge-pump power supplies 22 and 23, even when their pump operations are inactivated. More specifically, the drop margin at the end of the hold mode can be contained within 10% of the absolute values of the voltages (absolute values of Vdd, Vgh, Vgl) which are to be outputted during the scanning mode, and the time interval for the voltages to return to their output values at the end of the hold mode (recovery time from the drop) can be contained within several ten μsec.

Thus, even when pump-operations of the charge-pump power supplies 22 and 23 are inactivated, there will no substantial drop of output voltages of the power supply 7*d*, and the recovery time from the drop is short. Therefore, the drivers 5, 6, and 8 can property drive the TFT panel 2 despite inactivated pump operations. As a result, power consumption of the entire system including the liquid crystal display device 61 can be reduced.

Note that, the foregoing described the case where the load current in the hold mode is not more than 0.01 times that in the scanning mode and the repetitive period of the two modes is several hundred msec. However, not limiting to this, substantially the same effect can be obtained, for example, when the drop margin at the end of the hold mode is within 10% of the output values. Further, substantially the same effect can be obtained when the recovery time after the drop is within several μsec. In any case, substantially the same effect can be obtained when the load current in the hold mode and the duration of the hold mode are set so that the output voltages in the hold mode can be maintained by the respective smoothing capacitors (C2).

As described, an image display device (21, 31) according to the present invention is an active-matrix image display device which includes a power supply (7*a*, 7*b*, 7*c*) of a charge-pump system, and drivers (5, 6, 8) which come into operation in response to supply of power from the power supply to drive display cells (TFT panel 2), the drivers having two operation modes including a scanning mode in which a video signal is applied to any of the display cells, and a hold mode in which no video signal is applied to the display cells, and the active-matrix image display device comprises: a mode switching section (operation mode controller 9, 32) for periodically changing the operation modes so that duration of the hold mode is equal to or longer than duration of the scanning mode; and a control section (load current detector 24, operation mode controller 32) for switching, according to the operation modes, a frequency at which pump operation of the power supply is activated.

According to this arrangement, the mode switching section periodically switches operation modes of the drivers. In the scanning mode, the drivers apply a video signal to any of the display cells and thus consumes relatively large power. On the other hand, in the hold mode, the drivers apply no video signal to the display cells and thus power consumption is lower than that in the scanning mode.

Further, for example, where low power consumption is required, such as during standby of a portable phone, the mode switching section switches the operation modes, while substantially maintaining display of the display cells, so that the duration of the hold mode becomes longer than that of the scanning mode. As a result, power consumption of the drivers and the display cells can be greatly reduced.

The control section switches frequencies of the pump operation of the power supply according to operation modes, for example, by measuring consumed current or detecting a signal for switching the operation modes. As a result, the power supply can effect the pump operation at a frequency according to operation modes, thus generating output voltages without fail at high conversion efficiency in either operation mode.

This makes it possible to provide an active-matrix image display device with a basic display quality such as brightness, contrast, response speed, and tones, while maintaining power consumption at low level.

Further, in addition to the foregoing arrangement, it is preferable that an operating current value in the scanning mode of the drivers and an operating current value in the hold mode of the drivers differ by 10 times or more, and a frequency of the pump operation is decided according to a maximum value of operating current values of the drivers, and circuit elements of the power supply are arranged according to the frequency of the pump operation.

According to this arrangement, when the control section switches frequencies of pump operation according to a large change of operation current values of the drivers which make up a group of load circuits, the frequency of pump operation is decided according to the maximum value of the operation current values, and circuit elements of the power supply are arranged according to this frequency. For example, capacitance of the capacitor for the pump operation or a smoothing capacitor, and element configurations such as L/W of the MOSFETs which switch capacitors for the pump operation are decided based on the maximum value of required operation current values and the frequency at this maximum value, and capacitance and a resistance value of the CR oscillator are decided based on the frequency.

Thus, in addition to obtaining high conversion efficiency even at the maximum value of the operation current values, it is also possible, by the reduced frequency of the pump operation, to reduce a self-loss of power in the power supply, such as the leak current by the MOSFETs, or the power consumed by the CR oscillator, even under extremely light load, thus obtaining high conversion efficiency.

Further, in addition to the foregoing arrangements, the power supply preferably includes a first oscillator (oscillator 51) which generates a first clock signal which is used as a reference in the pump operation of the power supply in the scanning mode.

According to this arrangement, since the first clock signal having a higher frequency than the clock signal which is used as a reference in the pump operation of the power supply in the hold mode is generated internally, not externally, in the first oscillator in the image display device, the distance travelled by the first clock signal can be made shorter and a wiring capacity can be reduced. As a result, power consumption of the image display device can be reduced compared with the case where the first clock signal is externally supplied.

In addition, the power supply may include a divider (frequency divider 52) which divides the first clock signal to generate a second clock signal which is used as a reference in the pump operation of the power supply in the hold mode.

According to this arrangement, because the first clock signal is divided, the second clock signal is also generated in the image display device. Thus, the power required to transfer the second clock signal can be reduced, and therefore a low power consuming image display device can be realized.

Meanwhile, instead of the divider, the power supply may include an input terminal (55) for inputting a second clock signal which is used as a reference in the pump operation of the power supply in the hold mode, and an oscillator control section (load current detector 24, operation mode controller 32) for inactivating operation of the first oscillator during at least a part of a period of the pump operation operated by the second clock signal. Further, the power supply may include a second oscillator (oscillator 54) which generates a second clock signal which is used in the pump operation of the power supply in the hold mode, and an oscillator control section (load current detector 24, operation mode controller 32) for inactivating operation of the first oscillator during at least a part of a period of the pump operation operated by the second clock signal.

According to these arrangements, since the first oscillator is inactivated during at least a part of a period of the pump operation operated by the second clock signal, the power consumed by the first oscillator can be reduced compared with the case where the first oscillator is operated all the time. Note that, the second clock signal is generated independently from the first clock signal which is generated in the first oscillator. Thus, the pump operation of the power supply can be carried out without any trouble even though the first oscillator is inactivated. Further, since the second clock signal has a lower frequency than the first clock signal, even when the second clock signal is generated externally, the power required to generate and transfer the second clock signal is often less than the power consumed by the first oscillator. Thus, the total power consumption of the image display device including the generator of the second clock signal can be reduced.

Incidentally, in the foregoing image display devices, the frequency of pump operation is changed for a period according to the hold mode. However, the pump operation itself may be inactivated in the hold mode if inactivation of pump operation does not influence operation or display of the drivers.

More specifically, an image display device (liquid crystal display device 61) according to the present invention is an active-matrix image display device which includes a power supply (7*d*) of a charge-pump system, and drivers (5, 6, 8) which come into operation in response to supply of power from the power supply to drive display cells (TFT panel 2), and the image display device has the following arrangement.

That is, the drivers have two operation modes including a scanning mode in which a video signal is applied to any of the display cells, and a hold mode in which no video signal is applied to the display cells, the power supply maintaining an output voltage value by a smoothing capacitor (C2) which is maintained at an output of the power supply while the pump operation is inactive, and the power supply includes: a control section (load current detector 24, operation mode controller 32) for stopping the pump operation of the power supply according to the hold mode; and a mode switching section (operation mode controller 9, 32) for periodically changing the operation modes so that duration of the hold mode is equal to or longer than duration of the scanning mode.

According to this arrangement, as in the foregoing image display device, the operation modes are switched, while substantially maintaining display of the display cells, so that the duration of the hold mode becomes longer than that of the scanning mode. As a result, power consumption of the drivers and the display cells can be greatly reduced. Further, since the pump operation of the power supply is inactivated for a period according to the hold mode, the power consumption of the power supply during a hold mode can also be reduced. Note that, since no video signal is applied to any display cell in the hold mode, the image display device can maintain a displayed image without any trouble even when the pump operation of the power supply is inactivated until the next scanning mode.

This makes it possible to provide an active-matrix image display device with a basic display quality such as brightness, contrast, response speed, and tones, while maintaining power consumption at low level.

In addition to the foregoing arrangement, the mode switching section may periodically switch the operation modes so that duration of the hold mode becomes equal to or longer than duration of the scanning mode, and a drop margin of the output voltage value when the pump operation is resumed is not more than 10% of an output voltage value to be maintained.

According to this arrangement, despite that operation modes are switched, a drop margin of the output voltage value when the pump operation is resumed is not more than 10% of an output voltage value to be maintained. This allows the image display device to maintain a displayed image without any trouble, even though the power consumption of the power supply is reduced by inactivating the pump operation of the power supply for a period according to the hold mode.

This makes it possible to provide an active-matrix image display device with a basic display quality such as brightness, contrast, response speed, and tones, while maintaining power consumption at low level.

Further, irrespective of whether the pump operation is inactivated or not, in addition to the foregoing arrangements, it is preferable that the scanning mode and the hold mode are periodically repeated with a period of several hundred msec.

According to this arrangement, for example, when the load circuit has one of the operation modes most of the time, the use of the power supply according to this operation mode does not pose any problem, but in the active-matrix image display device which requires re-application of signals to maintain a displayed image (i.e., the scanning mode needs to be introduced regularly), the scanning mode and the hold mode may be periodically repeated with a period of several hundred msec. This is where the use of the foregoing power supply is effective.

Further, instead of the mode switching section which switches the operation modes so that the drop margin is not more than 10%, it is possible alternatively to provide a mode switching section which can switch the operation modes so that duration of the hold mode becomes equal to or longer than duration of the scanning mode, and a recovery time required for an output voltage value which was dropped while the pump operation was inactive to return to the output voltage value to be maintained from resumption of the pump operation is within several ten μsec, and the scanning mode and the hold mode are periodically repeated with a period of several hundred msec.

Further, when an operating current value in the hold mode of the drivers is not more than 0.01 times an operating current value in the scanning mode, it is possible to provide, instead of the mode switching section which switches the operation modes so that the drop margin is not more than 10%, a mode switching section which can switch the operation modes so that duration of the hold mode becomes equal to or longer than duration of the scanning mode, and the scanning mode and the hold mode are periodically repeated with a period of several hundred msec.

According to these arrangements, since the scanning mode and the hold mode are periodically repeated with a several hundred msec, and by the foregoing recovery time or the operation current values in the hold mode, the image display device can maintain a displayed image without any trouble despite that the pump operation of the power supply is inactivated for a period according to the hold mode to reduce power consumption of the power supply.

This makes it possible to provide an active-matrix image display device with a basic display quality such as brightness, contrast, response speed, and tones, while maintaining power consumption at low level.

Further, irrespective of whether the pump operation is inactivated or not, or the way the mode switching section switches the operation modes, it is preferable that a period of the hold mode is set to be several times to several ten times longer than a period of the scanning mode.

According to this arrangement, since the period of hold mode in which power consumption is low is much longer (several times to several ten times) than the period of scanning mode in which power consumption is high, it is highly effective to reduce power consumption under light load in the foregoing manner.

Further, in addition to the foregoing arrangements, it is preferable that the control section makes up the mode switching sections, and, when increasing frequency or resuming pump operation, switches the frequency or resumes the pump operation in advance a predetermined time interval before switching of the operation modes, so that the increase of frequency or resumption of pump operation is finished by the time the switching of the operation modes is started.

According to this arrangement, the control section, being the mode switching section, can detect switching of operation modes beforehand. Utilizing this, by increasing the frequency of pump operation or resuming the pump operation before switching of operation modes, a required operation current can be sufficiently supplied immediately after switching of operation modes. Further, by reducing frequency or inactivating pump operation at the time of switching of operation modes, or after a predetermined time period from the switching, there will be no shortage of the operation current.

Further, in addition to the foregoing arrangements, among power consumption of an image display section including the display cells and the drivers, power consumption in the hold mode is preferably lower than power consumption of the control section and the power supply itself in the scanning mode.

According to this arrangement, by reducing frequency of the power supply in the hold mode in the described manner under such circumstances where power consumption of the image display section in the hold mode is extremely low and influence of power consumption of the power supply itself is large, the influence of the power supply can be made smaller.

Further, in addition to the foregoing arrangements, it is preferable to include: a first power supply (charge-pump power supply 22) for multiplying an input voltage by a predetermined constant factor; a regulator (41) for generating a first voltage by stabilizing an output voltage of the first power supply to a predetermined value, and supplying the first voltage to the drivers; and a second power supply (charge-pump power supplies 23, 23*a*, 23*b*) for generating a second voltage by multiplying the first voltage by a predetermined constant factor, and supplying the second voltage as an ON voltage or an OFF voltage to a scanning signal line driver (5), which is one of the drivers, wherein at least one of the first power supply and the second power supply makes up the power supply under control of the control section.

Alternatively, instead of the first and second power supplies, it is possible to include: a first power supply (charge-pump power supply 22) for raising an input voltage by a predetermined factor; a second power supply (charge-pump power supply 23*a*) for raising the first voltage by a predetermined factor, and supplying the first voltage as an ON voltage of a scanning signal line driver (5), which is one of the drivers; and a third power supply (charge-pump power supply 23*b*) for inverting and raising the first voltage by a predetermined factor, and supplying the first voltage as an OFF voltage of the scanning signal line driver, which is one of the drivers, wherein at least one of the first power supply, the second power supply, and the third power supply makes up the power supply under control of the control section.

According to these arrangements, by the provision of the regulator which stabilizes the output voltage of the first power supply, even when different input voltages are inputted to the first power supply of the image display device, for example, as in the case where image display devices of the same structure are used among systems employing batteries of different output voltages, the same voltage can be generated and supplied to the drivers.

Further, portable electrical equipment of the present invention includes any one of the foregoing image display devices.

According to this arrangement, in view of the fact that portable electrical equipment is usually driven by an installed battery, to reduce power consumption in the described manner is effective. It is particularly effective when the portable electrical equipment is a terminal device of a portable phone since in this case a standby time can be extended.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An active-matrix image display device which includes a power supply of a charge-pump system, and drivers which come into operation in response to a supply of power from the power supply to drive display cells, said drivers having two operational modes including a scanning mode during which said active matrix display is vertically scanned and in which said power supply operates at a first frequency and a video signal is applied to any of the display cells, and a hold mode in which said power supply operates at a second non-zero frequency smaller than said first frequency and no video signal is applied to any of the display cells, said active-matrix image display device comprising:

mode switching means for periodically changing the operational modes so that a duration of the hold mode is equal to or longer than a duration of the scanning mode; and control means for switching, according to the operational modes, the frequency at which pump operation of the power supply is activated.

2. The active-matrix image display device as set forth in claim 1, wherein:

a maximum of the operating current value in the scanning mode of the drivers and an operating current value in the hold mode of the drivers differ by 10 times or more, said frequency at which pump operation of the power supply is activated by said control means is established according to said maximum value of the operating current values of the drivers, and said power supply is configured so as to provide high conversion efficiency at said frequency.

3. The active-matrix image display device as set forth in claim 1, wherein said power supply includes a first oscillator which generates a first clock signal which is used as a reference in the pump operation of the power supply in the scanning mode.

4. The active-matrix image display device as set forth in claim 3, wherein said power supply includes a divider which divides the first clock signal to generate a second clock signal which is used as a reference in the pump operation of the power supply in the hold mode.

5. The active-matrix image display device as set forth in claim 3, wherein, said power supply includes an input terminal for inputting a second clock signal which is used as a reference in the pump operation of the power supply in the hold mode, and oscillator control means for inactivating operation of the first oscillator during at least a part of a period of the pump operation operated by the second clock signal.

6. The active-matrix image display device as set forth in claim 3, wherein said power supply includes a second oscillator which generates a second clock signal which is used in the pump operation of the power supply in the hold mode, and oscillator control means for inactivating operation of the first oscillator during at least a period of the pump operation operated by the second clock signal.

7. The active-matrix image display device as set forth in claim 1, wherein:

the scanning mode and the hold mode are repeated periodically with a period of several hundred msec.

8. The active-matrix image display device as set forth in claim 1, wherein:

a period of the hold mode is set to be several times to several ten times longer than a period of the scanning mode.

9. The active-matrix image display device as set forth in claim 1, wherein said control means makes up said mode switching means, and, when increasing frequency, switches the frequency in advance a predetermined time interval before switching of the operation modes, so that the increase of frequency is finished by the time the switching of the operational modes is started.

10. The active-matrix image display device as set forth in claim 1, wherein:

among power consumption of an image display section including the display cells and drivers, power consumption in the hold mode is lower than power consumption of the control means and the power supply itself in the scanning mode.

11. The active-matrix image display device as set forth in claim 1, comprising:

a first power supply for multiplying an input voltage by a predetermined constant factor;

a regulator for generating a first voltage by stabilizing an output voltage of the first power supply to a predetermined value, and supplying the first voltage to the drivers; and a second power supply for generating a second voltage by multiplying the first voltage by a predetermined constant factor, and supplying the second voltage as an ON voltage or an OFF voltage to a scanning signal line driver, which is one of the drivers, wherein at least one of the first power supply and the second power supply makes up the power supply under control of the control means.

12. The active-matrix image display device as set forth in claim 1, comprising:

a first power supply for raising an input voltage by a predetermined factor;

a regulator for generating a first voltage by stabilizing an output voltage of the first power supply to a predetermined value, and supplying the first voltage to the drivers;

a second power supply for raising the first voltage by a predetermined factor, and supplying the resulting voltage as an ON voltage of a scanning signal line driver, which is one of the drivers; and a third power supply for inverting and raising the first voltage by a predetermined factor, and supplying the resulting voltage as an OFF voltage to the scanning signal line driver, which is one of the drivers, wherein at least one of the first power supply, the second power supply, and the third power supply makes up the power supply under control of the control means.

13. An active-matrix image display device as set forth in claim 1, wherein, when power consumption is to be reduced, said drivers increase a vertical scanning period of said display so as to be longer than a normal vertical scanning period of said device.

14. An active-matrix image display device as set forth in claim 1, wherein, when power consumption is to be reduced, said drivers insert a hold mode in the scanning mode that is an operational mode under normal driving conditions of said device so as to increase a vertical scanning period of said display so as to be longer than a normal vertical scanning period of said device.

15. The active-matrix image display device as set forth in claim 1, wherein:

a maximum of the operating current value in the scanning mode of the drivers and an operating current value in the hold mode of the drivers differ by 10 times or more, said frequency at which pump operation of the power supply is activated by said control means is established according to said maximum value of the operating current values of the drivers, and the maximum values of the operating current values and the frequency at that maximum value determine a capacitance of a capacitor and a capacitance of a smoothing capacitor for pump operation, and also determine the configuration of a switching element for switching said capacitor for pump operation, and said frequency at said maximum value determines a capacitance and a resistance of a CR oscillator that constitutes a clock generator for generating a clock signal to be fed to the switching element.

16. The image display device of claim 1, wherein a non-scanning voltage is output to all scanning signal lines in the hold mode, so as to maintain display by means of electric charge stored in a pixel electrode or an auxiliary capacitor of each pixel.

17. The image display device of claim 16, wherein an auxiliary capacitor electrode pad and a auxiliary capacitor wire as the auxiliary capacitor are provided on a position where substantially no capacitive coupling with the scanning signal line occurs.

18. The image display device of claim 17, wherein a part of the auxiliary capacitor wire is paired with the auxiliary capacitor electrode pad with a gate insulating film therebetween, avoiding the scanning signal line.

19. The image display device of claim 18, wherein the auxiliary capacitor wire is provided parallel to the scanning signal line.

20. Portable electrical equipment with an image display device, said image display device being an active-matrix image display device which includes a power supply of a charge-pump system, and drivers which come into operation in response to a supply of power from the power supply to drive display cells, said drivers having two operational modes including a scanning mode during which said active matrix display is vertically scanned and in which said power supply operates at a first frequency and a video signal is applied to any of the display cells, and a hold mode in which said power supply operates at a second non-zero frequency smaller than said first frequency and no video signal is applied to any of the display cells; said image display device comprising:

mode switching means for periodically changing the operational modes so that a duration of the hold mode is equal to or longer than a duration of the scanning mode; and control means for switching, according to the operational modes, the frequency at which pump operation of the power supply is activated.

21. An active-matrix image display device as set forth in claim 20, wherein, when power consumption is to be reduced, said drivers increase a vertical scanning period of said display so as to be longer than a normal vertical scanning period of said device.

22. An active-matrix image display device as set forth in claim 20, wherein, when power consumption is to be reduced, said drivers insert a hold mode in the scanning mode that is an operational mode under normal driving conditions of said device so as to increase a vertical scanning period of said display so as to be longer than a normal vertical scanning period of said device.

23. The image display device of claim 20, wherein a non-scanning voltage is output to all scanning signal lines in the hold mode, so as to maintain display by means of electric charge stored in a pixel electrode or an auxiliary capacitor of each pixel.

24. The image display device of claim 23, wherein an auxiliary capacitor electrode pad and a auxiliary capacitor wire as the auxiliary capacitor are provided on a position where substantially no capacitive coupling with the scanning signal line occurs.

25. The image display device of claim 24, wherein a part of the auxiliary capacitor wire is paired with the auxiliary capacitor electrode pad with a gate insulating film therebetween, avoiding the scanning signal line.

26. The image display device of claim 25, wherein the auxiliary capacitor wire is provided parallel to the scanning signal line.

27. An active-matrix image display device which includes a power supply of a charge-pump system, and drivers which come into operation in response to a supply of power from the power supply to drive display cells, said drivers having two operational modes including a scanning mode during which said active matrix display is vertically scanned and in which a video signal is applied to any of the display cells, and a hold mode in which no video signal is applied to any of the display cells, said power supply maintaining an output voltage value while said drivers are in said hold mode by a smoothing capacitor which is located between an input to said drivers and an output of the power supply, said power supply including:

control means for stopping the pump operation of the power supply while said drivers are in said hold mode, and mode switching means for periodically changing the operational modes so that a duration of the hold mode is equal to or longer than a duration of the scanning mode.

28. The active-matrix image display device as set forth in claim 27, wherein the scanning mode and the hold mode are periodically repeated with a period of several hundred msec.

29. The active-matrix image display device as set forth in claim 27, wherein said mode switching means periodically switches the operational modes so that the duration of the hold mode becomes equal to or longer than the duration of the scanning mode, and any decrease in the output voltage value of the power supply present when pump operation is resumed at the time of a switch from the hold mode to the scanning mode is not more than 10% of an output voltage value to be maintained.

30. The active-matrix image display device as set forth in claim 27, wherein said mode switching means switches the operational modes so that a duration of the hold mode becomes equal to or longer than a duration of the scanning mode, and a recovery time required for an output voltage value which dropped while the pump operation was inactive to return to the output voltage value to be maintained from resumption of the pump operation is within several ten msec, and the scanning mode and the hold mode are periodically repeated with a period of several hundred msec.

31. The active-matrix image display device as set forth in claim 27, wherein:

an operating current value in the hold mode of the drivers is not more than 0.01 times an operating current value in the scanning mode, and said mode switching means switches the operational modes so that a duration of the hold mode becomes equal to or longer than a duration of the scanning mode, and the scanning mode and the hold mode are periodically repeated with a period of several hundred msec.

32. The active-matrix image display device as set forth in claim 27, wherein a period of the hold mode is set to be several times to several ten times longer than a period of the scanning mode.

33. The active-matrix image display device as set forth in claim 27, wherein said control means makes up said mode switching means, and, when resuming pump operation, resumes the pump operation in advance of a predetermined time interval before switching of the operational modes, so that resumption of pump operation is finished by the time the switching of the operational modes is started.

34. The active-matrix image display device as set forth in claim 27, wherein:
among power consumption of an image display section including the display cells and the drivers, power consumption in the hold mode is lower than power consumption of the control means and power supply itself in the scanning mode.

35. The active-matrix image display device as set forth in claim 27, comprising:
a first power supply for multiplying an input voltage by a predetermined constant factor;
a regulator for generating a first voltage by stabilizing an output voltage of the first power supply to a predetermined value, and supplying the resulting voltage to the drivers; and
a second power supply for generating a second voltage by multiplying the first voltage by a predetermined constant factor, and supplying the resulting voltage as an ON voltage or an OFF voltage to a scanning signal line driver, which is one of the drivers,
wherein at least one of the first power supply and the second power supply makes up the power supply under the control of the control means.

36. The active-matrix image display device as set forth in claim 27, comprising:
a first power supply for raising an input voltage by a predetermined factor;
a regulator for generating a first voltage by stabilizing an output voltage of the first power supply to a predetermined value, and supplying the first voltage to the drivers;
a second power supply for raising the first voltage by a predetermined factor, and supplying the resulting voltage as an ON voltage to a scanning signal line driver, which is one of the drivers; and
a third power supply for inverting and raising the first voltage by a predetermined factor, and supplying the resulting voltage as an OFF voltage to the scanning signal line driver, which is one of the drivers,
wherein at least one of the first power supply, the second power supply, and the third power supply makes up the power supply under control of the control means.

37. An active-matrix image display device as set forth in claim 27, wherein, when power consumption is to be reduced, said drivers increase a vertical scanning period of said display so as to be longer than a normal vertical scanning period of said device.

38. An active-matrix image display device as set forth in claim 27, wherein, when power consumption is to be reduced, said drivers insert a hold mode in the scanning mode that is an operational mode under normal driving conditions of said device so as to increase a vertical scanning period of said display so as to be longer than a normal vertical scanning period of said device.

39. The image display device of claim 27, wherein a non-scanning voltage is output to all scanning signal lines in the hold mode, so as to maintain display by means of electric charge stored in a pixel electrode or an auxiliary capacitor of each pixel.

40. The image display device of claim 39, wherein an auxiliary capacitor electrode pad and a auxiliary capacitor wire as the auxiliary capacitor are provided on a position where substantially no capacitive coupling with the scanning signal line occurs.

41. The image display device of claim 40, wherein a part of the auxiliary capacitor wire is paired with the auxiliary capacitor electrode pad with a gate insulating film therebetween, avoiding the scanning signal line.

42. The image display device of claim 41, wherein the auxiliary capacitor wire is provided parallel to the scanning signal line.

43. Portable electrical equipment with an image display device, said image display device being an active-matrix image display device which includes a power supply of a charge-pump system, and drivers which come into operation in response to a supply of power from the power supply to drive display cells, said drivers having two operational modes including a scanning mode during which said active matrix display is vertically scanned and in which a video signal is applied to any of the display cells, and a hold mode in which no video signal is applied to any of the display cells, said power supply maintaining an output voltage value while said drivers are in said hold mode by a smoothing capacitor which is located between an input to said drivers and an output of the power supply while the pump operation is inactive, said image display device comprising:
control means for stopping the pump operation of the power supply while said drivers are in said hold mode, and
mode switching means for periodically changing the operational modes so that a duration of the hold mode is equal to or longer than a duration of the scanning mode.

44. An active-matrix image display device as set forth in claim 43, wherein, when power consumption is to be reduced, said drivers increase a vertical scanning period of said display so as to be longer than a normal vertical scanning period of said device.

45. An active-matrix image display device as set forth in claim 43, wherein, when power consumption is to be reduced, said drivers insert a hold mode in the scanning mode that is an operational mode under normal driving conditions of said device so as to increase a vertical scanning period of said display so as to be longer than a normal vertical scanning period of said device.

46. The image display device of claim 43, wherein a non-scanning voltage is output to all scanning signal lines in the hold mode, so as to maintain display by means of electric charge stored in a pixel electrode or an auxiliary capacitor of each pixel.

47. The image display device of claim 46, wherein an auxiliary capacitor electrode pad and a auxiliary capacitor wire as the auxiliary capacitor are provided on a position where substantially no capacitive coupling with the scanning signal line occurs.

48. The image display device of claim 47, wherein a part of the auxiliary capacitor wire is paired with the auxiliary capacitor electrode pad with a gate insulating film therebetween, avoiding the scanning signal line.

49. The image display device of claim 48, wherein the auxiliary capacitor wire is provided parallel to the scanning signal line.

* * * * *